US012668997B2

(12) United States Patent
Varadaraju et al.

(10) Patent No.: US 12,668,997 B2
(45) Date of Patent: *Jun. 30, 2026

(54) ROTATION CONVERTER

(71) Applicant: Schlage Lock Company LLC, Carmel, IN (US)

(72) Inventors: Nagesh Varadaraju, Bangalore (IN); Aaron P. McKibben, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/740,091

(22) Filed: Jun. 11, 2024

(65) Prior Publication Data

US 2025/0075533 A1 Mar. 6, 2025

Related U.S. Application Data

(63) Continuation of application No. 17/351,725, filed on Jun. 18, 2021, now Pat. No. 12,006,734.

(51) Int. Cl.
| | |
|---|---|
| *E05B 65/10* | (2006.01) |
| *E05B 15/00* | (2006.01) |
| *F16H 19/00* | (2006.01) |

(52) U.S. Cl.
CPC ...... *E05B 65/1053* (2013.01); *E05B 15/0013* (2013.01); *F16H 19/001* (2013.01)

(58) Field of Classification Search
CPC ............ E05B 15/0013; E05B 15/0033; E05B 47/0012; E05B 47/0692; E05B 63/0056;
(Continued)

(56) References Cited

U.S. PATENT DOCUMENTS

| | | |
|---|---|---|
| 768,138 A | 8/1904 | Northrup |
| 2,904,212 A | 9/1959 | Vischer |
| | (Continued) | |

FOREIGN PATENT DOCUMENTS

| | | |
|---|---|---|
| CN | 105298225 A | 2/2016 |
| EP | 2685035 A2 | 1/2014 |
| | (Continued) | |

OTHER PUBLICATIONS

International Search Report; International Searching Authority; International Patent Application No. PCT/US2022/034020; Sep. 28, 2022; 2 pages.

(Continued)

*Primary Examiner* — Steven A Tullia
(74) *Attorney, Agent, or Firm* — Taft Stettinius & Hollister LLP

(57) ABSTRACT

A rotation converter according to certain embodiments generally includes a case, an input member, a shuttle, and an output member. The input member is rotatably mounted to the case, and is rotatable from an input member home position in each of a first rotational direction and a second rotational direction. The shuttle is movably mounted in the case, and is engaged with the input member such that rotation of the input member from the input member home position in each of the first rotational direction and the second rotational direction drives the shuttle from a shuttle home position to a shuttle actuated position. The output member is rotatably mounted to the case and engaged with the shuttle such that the output member rotates in an output member rotational direction in response to movement of the shuttle from the shuttle home position to the shuttle actuated position.

20 Claims, 19 Drawing Sheets

(58) Field of Classification Search

CPC .. E05B 63/042; E05B 65/1053; E05B 65/108; E05B 2001/0076; E05B 81/12; E05B 81/32; E05B 81/42; F16H 19/001; Y10T 292/57; Y10T 292/0908; Y10T 292/1054; Y10T 292/1056

USPC .................................................. 74/63; 70/92

See application file for complete search history.

(56) References Cited

U.S. PATENT DOCUMENTS

| | | | |
|---|---|---|---|
| 3,409,164 A | | 11/1968 | Vischer |
| 3,563,585 A | | 2/1971 | Welch |
| 3,961,817 A | | 6/1976 | Schrimsher |
| RE30,816 E | | 12/1981 | Schrimsher |
| 4,333,324 A | * | 6/1982 | Dietrich ................ E05B 55/005 |
| | | | 292/172 |
| 4,672,828 A | * | 6/1987 | Theriault ........... E05B 63/0065 |
| | | | 70/451 |
| 4,725,085 A | * | 2/1988 | Hu .......................... E05B 55/00 |
| | | | 292/1.5 |
| 4,934,800 A | | 6/1990 | Choi |
| 4,988,136 A | | 1/1991 | Gressett, Jr. |
| 5,335,948 A | | 8/1994 | Norton, II et al. |
| 6,041,630 A | | 3/2000 | Shen |
| 6,101,856 A | | 8/2000 | Pelletier et al. |
| 6,257,030 B1 | | 7/2001 | Davis, III et al. |
| 6,328,357 B1 | * | 12/2001 | Overbey ................ E05B 1/003 |
| | | | 292/172 |
| 6,334,636 B1 | | 1/2002 | Huang et al. |
| 6,553,799 B2 | | 4/2003 | Bates et al. |
| 6,802,546 B2 | | 10/2004 | Bates et al. |
| 6,854,308 B2 | | 2/2005 | Shieh |
| 6,921,116 B2 | | 7/2005 | Humes |
| 7,748,759 B2 | * | 7/2010 | Chen ..................... E05B 63/042 |
| | | | 292/DIG. 60 |
| 7,856,856 B2 | | 12/2010 | Shvartz |
| 8,882,162 B2 | * | 11/2014 | Uyeda ..................... E05B 59/00 |
| | | | 70/91 |
| 9,222,286 B2 | | 12/2015 | Uyeda |
| 9,790,713 B2 | | 10/2017 | Mani et al. |
| 9,982,461 B1 | * | 5/2018 | Kilbourne ........... E05B 47/0012 |
| 10,954,694 B2 | | 3/2021 | Mani et al. |
| 11,851,915 B2 | * | 12/2023 | Kumar .................... E05B 65/10 |
| 12,006,734 B2 | * | 6/2024 | Varadaraju ........... E05B 63/042 |
| 2001/0023600 A1 | | 9/2001 | Pompeii |
| 2002/0117867 A1 | | 8/2002 | Bates et al. |
| 2004/0239121 A1 | | 12/2004 | Morris |
| 2006/0010942 A1 | * | 1/2006 | Toloday ............. E05B 63/0065 |
| | | | 70/210 |
| 2007/0114801 A1 | | 5/2007 | Lin |
| 2008/0141740 A1 | | 6/2008 | Shvartz |
| 2009/0308112 A1 | | 12/2009 | Uyeda |
| 2010/0213724 A1 | | 8/2010 | Uyeda |
| 2013/0098124 A1 | | 4/2013 | Williams |
| 2013/0154283 A1 | | 6/2013 | Arlinghaus et al. |
| 2014/0001776 A1 | * | 1/2014 | Tanpure ................. E05B 83/42 |
| | | | 292/336.3 |
| 2015/0240530 A1 | | 8/2015 | Mani et al. |
| 2015/0354255 A1 | | 12/2015 | Wittelsbuerger et al. |
| 2017/0247912 A1 | | 8/2017 | Ando |
| 2017/0292294 A1 | | 10/2017 | Brennan et al. |
| 2020/0328051 A1 | | 10/2020 | Treger et al. |
| 2021/0332618 A1 | * | 10/2021 | Kumar ...................... F16H 1/04 |
| 2023/0220701 A1 | * | 7/2023 | Mohammed ........ E05B 63/0069 |
| 2024/0125151 A1 | * | 4/2024 | Kumar .................... F16H 19/04 |
| 2025/0075533 A1 | * | 3/2025 | Varadaraju ........... F16H 19/001 |

FOREIGN PATENT DOCUMENTS

| | | | | |
|---|---|---|---|---|
| EP | 2910740 A1 | | 8/2015 | |
| GB | 2296285 A | | 6/1996 | |
| JP | 2019500523 A | * | 1/2019 | ........ E05B 47/0012 |
| KR | 20180003099 A | | 6/2016 | |
| SE | 543361 C2 | * | 12/2020 | ............ E05B 63/16 |
| WO | 9717517 A1 | | 5/1997 | |
| WO | 2007059100 A1 | | 5/2007 | |
| WO | 2017114534 A1 | | 7/2017 | |
| WO | 2020159939 A1 | | 8/2020 | |

OTHER PUBLICATIONS

Written Opinion of the International Searching Authority; International Searching Authority; International Patent Application No. PCT/US2022/034020; Sep. 28, 2022; 5 pages.

Extended European Search Report; European Patent Office; European Application No. 22825911.5; Jan. 20, 2025; 13 pages.

Patent Examination Report 2; New Zealand Intellectual Property Office; New Zealand Application No. 807168; Aug. 5, 2025; 4 pages.

Australian Examination Report No. 1; Australian Patent Office; Australian Patent Application No. 2022294909; Dec. 2, 2024; 4 pages.

Patent Examination Report 1; New Zealand Intellectual Property Office; New Zealand Application No. 807168; Jul. 8, 2025; 4 pages.

Examination Report; Canadian Intellectual Property Office; Canadian Patent Application No. 3,223,290; Jun. 11, 2025; 4 pages.

Patent Examination Report 3; New Zealand Intellectual Property Office; New Zealand Application No. 807168; Aug. 7, 2025; 2 pages.

Australian Patent Examination Report 1; IP Australia; Australian Patent Application No. 2025203444; Mar. 24, 2026; 3 pages.

* cited by examiner

ROTATION CONVERTER

CROSS REFERENCE TO RELATED APPLICATIONS

The present application is a continuation of U.S. patent application Ser. No. 17/351,725 filed Jun. 18, 2021 and issued as U.S. Pat. No. 12,006,734, the contents of which are hereby incorporated by reference in their entirety.

TECHNICAL FIELD

The present disclosure generally relates to rotation converters, and more particularly but not exclusively relates to rotation converters for exit device assemblies.

BACKGROUND

Exit device assemblies typically include a pushbar assembly mounted to an egress side of a door and a trim assembly mounted to the non-egress side of the door. The trim assembly may include a handle that is operable to rotate a drive spindle in each of a first direction and a second direction. The drive spindle may be engaged with the pushbar assembly such that rotation of the spindle in the first direction actuates the latch control assembly of the pushbar assembly. In certain pushbar assemblies, however, the latch control assembly is not capable of being actuated by the drive spindle when the drive spindle attempts to rotate in the second direction. As such, the handle must be rotated in the first direction in order to actuate the latch control assembly. In certain circumstances, however, it may be desirable for the handle to actuate the latch control assembly when rotated in the second direction.

Certain existing trim assemblies include mechanisms that convert rotation of the handle in the second (non-actuating) direction to rotation of the drive spindle in the first (actuating) direction. However, these mechanisms are typically bulky and increase the size of the trim assembly, which may be undesirable. Moreover, if a building owner wishes to upgrade an existing exit device assembly to enable actuation of the latch control assembly by rotation of the handle in both directions, the owner must replace the entire trim assembly, which can be costly and time consuming. Moreover, the bulky rotation-converting trim assemblies often lack the aesthetic appeal of the sleeker traditional designs. For these reasons among others, there remains a need for further improvements in this technological field.

SUMMARY

A rotation converter according to certain embodiments generally includes a case, an input member, a shuttle, and an output member. The input member is rotatably mounted to the case, and is rotatable from an input member home position in each of a first rotational direction and a second rotational direction. The shuttle is movably mounted in the case, and is engaged with the input member such that rotation of the input member from the input member home position in each of the first rotational direction and the second rotational direction drives the shuttle from a shuttle home position to a shuttle actuated position. The output member is rotatably mounted to the case and engaged with the shuttle such that the output member rotates in an output member rotational direction in response to movement of the shuttle from the shuttle home position to the shuttle actuated position. Further embodiments, forms, features, and aspects of the present application shall become apparent from the description and figures provided herewith.

DETAILED DESCRIPTION OF ILLUSTRATIVE EMBODIMENTS

Figure 2:
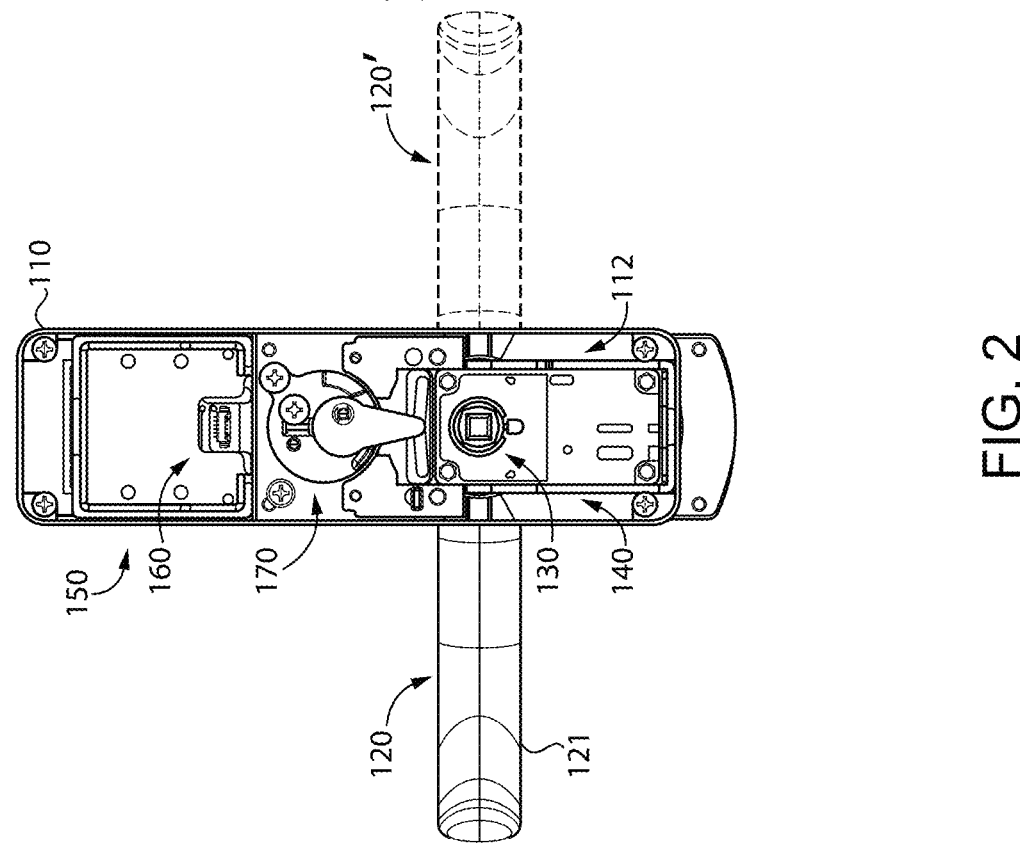
FIG. 2 is a rear plan view of a trim assembly that may be utilized in the exit device assembly illustrated in FIG. 1.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis (into and out of the page) defines first and second longitudinal directions, the Y-axis defines first and second lateral directions, and the Z-axis defines first and second transverse directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

Furthermore, certain features described herein may be described as configured to perform a function in response to either of a first condition and a second condition. For example, a component may be described as being "configured to perform function X in response to either of condition A and condition B." As used herein, such language indicates that the component is configured to perform function X in response to condition A, and is further configured to perform function X in response to condition B. Similarly, a description that a component is "configured to perform function X in response to each of condition A and condition B" indicates that the component is configured to perform function X in response to condition A, and is further configured to perform function X in response to condition B.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
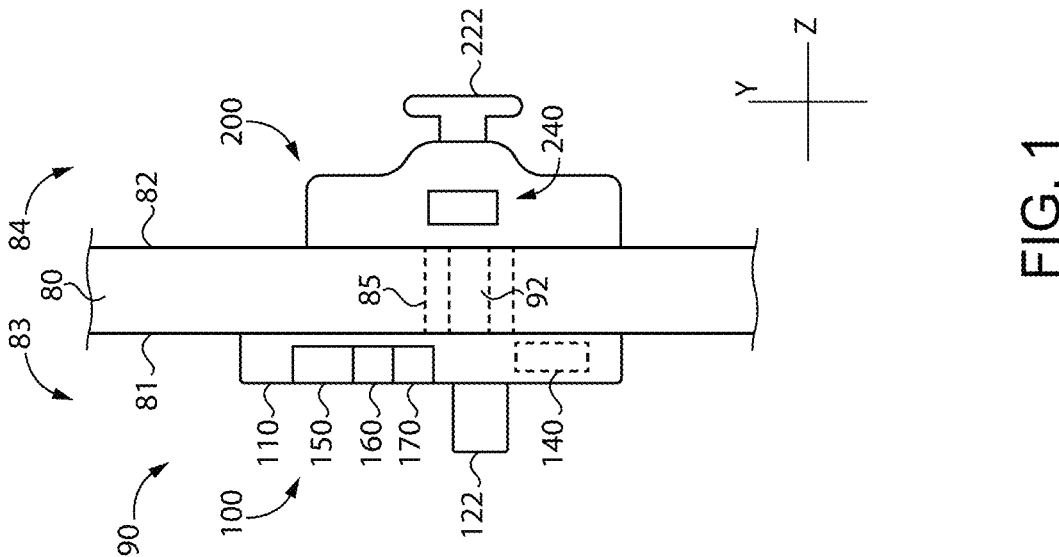
FIG. 1 is a schematic representation of an exit device assembly according to certain embodiments installed to a door.

With reference to FIG. 1, illustrated therein is a door 80 having installed thereon an exit device assembly 90 according to certain embodiments. The door 80 generally includes a non-egress side 81 and an egress side 82 opposite the non-egress side 81. When the door 80 is in its closed position, the non-egress side 81 faces an exterior or outer region 83, and the egress side 82 faces an interior or access-controlled region 84. Additionally, a door preparation 85 is formed in the door 80 and defines a pathway between the non-egress side 81 and the egress side 82. The exit device assembly 90 generally includes a trim 100 installed to the non-egress side 81, a pushbar assembly 200 installed to the egress side 82, and a rotation converter 92 seated in the door preparation 85 and operably connecting the trim 100 and the pushbar assembly 200. As described herein, the illustrated pushbar assembly 200 includes a latch mechanism 240 and a pushbar 222 operable to actuate the latch mechanism 240, and the trim 100 is at least selectively operable to actuate the latch mechanism 240 via the rotation converter 92.

With additional reference to FIG. 2, the trim 100 generally includes an escutcheon 110, a handle 120 rotatably mounted to the escutcheon 110, and a drive spindle 130 at least selectively connected with the handle 120. In certain embodiments, the trim assembly 100 may further include an electromechanical lock mechanism 140 operable to selectively connect the handle 120 with the drive spindle 130 and a control assembly 150 operable to control the electromechanical lock mechanism 140, and may further include a credential reader 160 in communication with the control assembly 150. In addition or as an alternative to the electromechanical lock mechanism 140, the trim 100 may include a mechanical lock mechanism 170 operable to selectively connect the handle 120 with the drive spindle 130.

The escutcheon 110 is mounted to the non-egress side 81 of the door 80, and defines a chamber 112 in which various components of the trim 100 are mounted. For example, the electromechanical lock mechanism 140 may be mounted in the chamber 112 along with the drive spindle 130, and the credential reader 160 may be mounted in the chamber 112 such that a front face of the credential reader 160 is accessible from outside the escutcheon 110.

Figure 3:
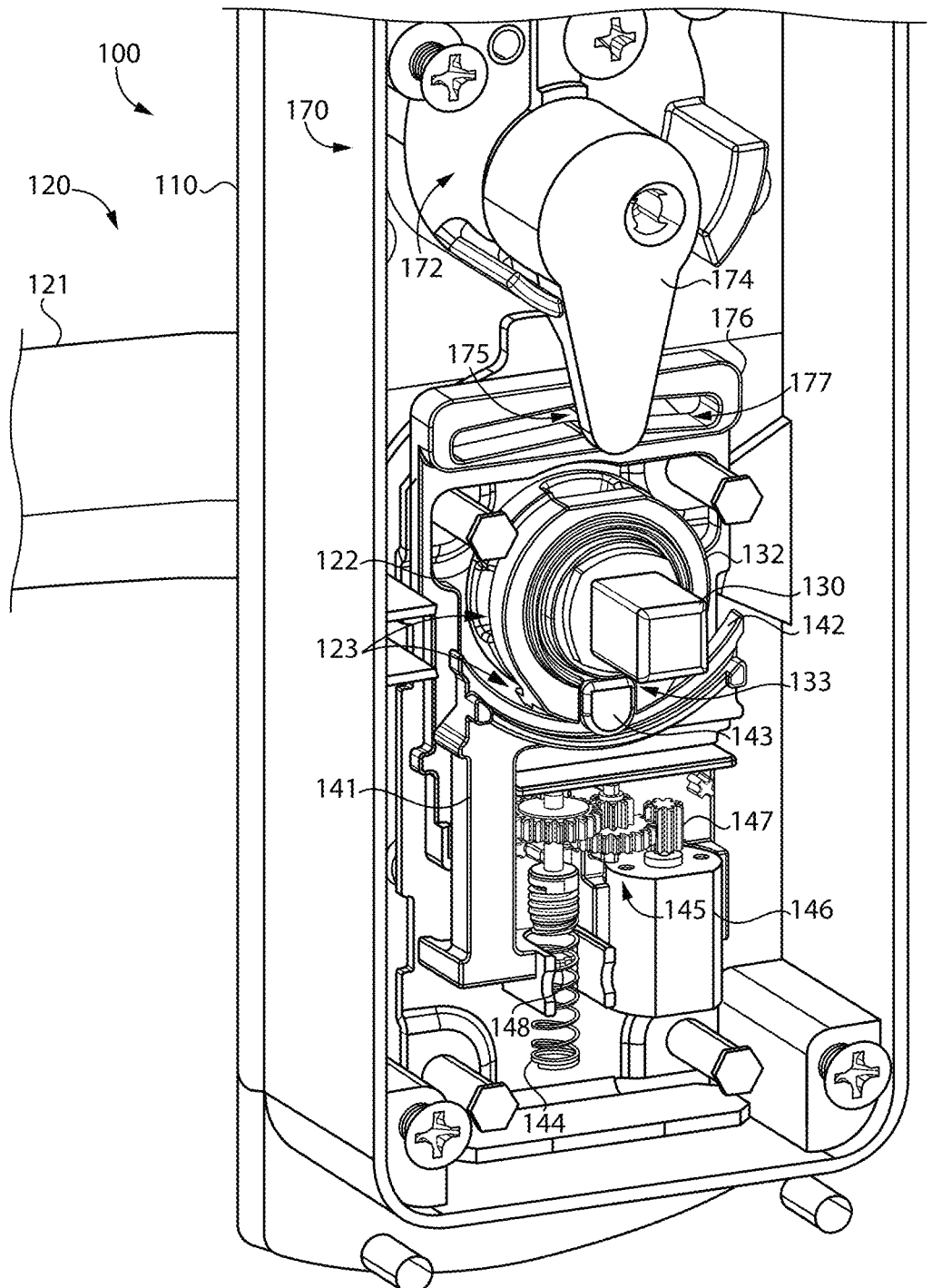
FIG. 3 is a perspective view of a portion of the trim assembly illustrated in FIG. 2.

With additional reference to FIG. 3, the handle 120 is rotatably mounted to the escutcheon 110, and is at least selectively operable to cause rotation of the drive spindle 130. In the illustrated form, the handle 120 is provided in the form of a lever handle that includes a shank and a grip portion 121 in the form of a lever that extends from the shank in a substantially horizontal direction. In other embodiments, the handle 120 may be provided in another form, such as that of a knob handle in which the grip portion is provided as a knob. As described herein, the handle 120 may be selectively coupled with the drive spindle 130 via the lock mechanism 140. It is also contemplated that the handle 120 may be at all times coupled with the drive spindle 130. In the illustrated form, the handle 120 is rotationally coupled with an adapter 122 that includes a plurality of notches 123, which facilitate the coupling of the handle 120 with the drive spindle 130 as described herein.

In the illustrated embodiment, the handle 120 is mounted to the escutcheon 110 in a right-handed orientation, in which the grip portion or lever 121 extends from the shank primarily in a rightward direction when viewing the front of the trim assembly 100. In this right-handed orientation, pressing the lever 121 downward pivots the handle 120 in a first direction (counter-clockwise in FIG. 2), and pressing the lever 121 upward pivots the handle 120 in an opposite second direction (clockwise in FIG. 2). It is also contemplated that the handle 120 may be mounted to the escutcheon 110 in a left-handed orientation, in which the lever 121 extends from the shank primarily in a leftward direction when viewing the front of the trim assembly 100. In this left-handed orientation (illustrated in phantom in FIG. 2 as the left-handed orientation 120'), pressing the lever 121 downward pivots the handle 120 in the second direction (clockwise in FIG. 2), and pressing the lever 121 upward pivots the handle in the first direction (counter-clockwise in FIG. 2).

The illustrated drive spindle 130 is rotationally coupled with a collar 132 that includes a notch 133. Additionally, the drive spindle 130 is at least selectively engaged with the handle 120 such that the handle 120 is at least selectively operable to rotate the spindle 130. When the handle 120 is connected with the drive spindle 130, rotation of the handle 120 in either handle direction causes a corresponding rotation of the drive spindle 130 in a corresponding drive spindle direction. As described herein, rotation of the drive spindle 130 is operable to actuate the latch mechanism 240 via the rotation converter 92.

The electromechanical lock mechanism 140 includes a movable wall 141 having an arcuate surface 142 that supports a coupler 143, a coil spring 144 engaged with the movable wall 142, a gear train 145 operable to rotate the spring 144, and a motor 146 including a motor shaft 147 operable to rotate the gear train 145. The coupler 143 has a coupling position and a decoupling position, and is biased toward the decoupling position, for example by a spring. In the coupling position, the coupler 143 is partially received in one of the adapter notches 123, and is partially received in the collar notch 133 such that the coupler 143 extends between and rotationally couples the adapter 122 and the collar 132. As a result, the handle 120 is operably coupled with the drive spindle 130 and is operable to rotate the drive spindle 130 to actuate the latch mechanism 240; the trim 100 is thus in an unlocked state. In the decoupling position, the coupler 143 is removed from the notches 123, 133 such that the adapter 122 is rotationally decoupled from the collar 132. As a result, the handle 120 is inoperable to rotate the drive spindle; the trim 100 is thus in a locked state.

As set forth above, the coupling position of the coupler 143 corresponds to the unlocked state of the trim 100, and the decoupling position of the coupler 143 corresponds to the locked state of the trim 100. The arcuate support surface 142 of the movable wall 141 is engaged with the coupler 143 such that movement of the movable wall 141 between an upper position and a lower position drives the coupler 143 between its coupling and decoupling positions. More particularly, when the movable wall 141 is in its upper position, the support surface 142 retains the coupler 143 in its coupling position, thereby unlocking the trim assembly 100. As such, the upper position of the movable wall 141 corresponds to the coupling position of the coupler 143 and the unlocked state of the trim assembly 100, and may alternatively be referred to as the unlocking position. When the movable wall 141 is in its lower position, the coupler 143 moves to the decoupling position to which the coupler 143 is biased, thereby locking the trim assembly 100. As such, the lower position of the movable wall 141 corresponds to the decoupling position of the coupler 143 and the locked state of the trim assembly 100, and may alternatively be referred to as the locking position.

The motor 146 is operable to rotate the motor shaft 147 in each of a first direction and a second direction under control of the control assembly 150. Rotation of the shaft 147 in the first direction causes the gear train 145 to rotate the spring 144 in a locking direction, and rotation of the shaft 147 in the second direction causes the gear train 145 to rotate the spring in an unlocking direction. During rotation of the spring 144 in the locking direction, the coils of the spring 144 engage a projection 148 of the wall 141 and urge the wall 141 downward toward its lower locking position, thereby placing the lock mechanism 140 in its locking state. During rotation of the spring 144 in the unlocking direction, the coils of the spring 144 engage the projection 148 and urge the wall 141 upward toward its upper unlocking position, thereby placing the lock mechanism 140 in its unlocking state.

Figure 4:
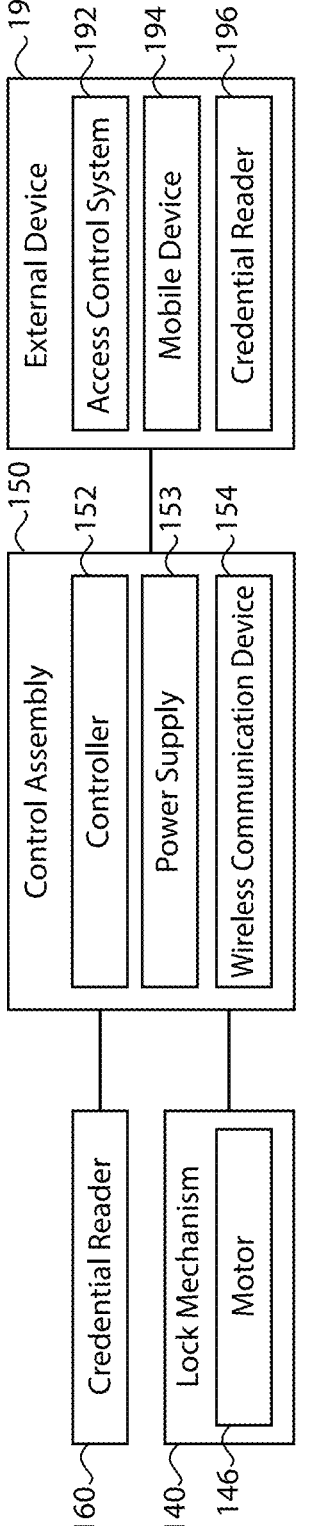
FIG. 4 is a schematic block diagram of the trim assembly illustrated in FIG. 2.

With additional reference to FIG. 4, the control assembly 150 is in communication with the electromechanical lock mechanism 140, and may further be in communication with one or more of the credential reader 160 or an external device 190. The illustrated control assembly 150 includes a controller 152, and may further include a power supply 153 and/or a wireless communication device 154. In certain embodiments, the power supply 153 may be an onboard power supply, such as one or more batteries. In certain embodiments, the control assembly 150 may be connected to an external power supply 153, such as line power. The wireless communication device 154 facilitates wireless communication with an external device 190, such as an access control system 192, a mobile device 194, or an external credential reader 196. It is also contemplated that the control assembly 150 may be in wired communication with an external device 190. In certain embodiments, the control assembly 150 may be provided as a standalone control assembly that does not communicate with an external device 190 during normal operation of the trim assembly 150.

The control assembly 150 is configured to control the electromechanical lock mechanism 140 to move between its locking and unlocking states. For example, the control assembly 150 may transmit to the motor 146 a locking signal that causes the motor 146 to rotate the motor shaft 147 in the first direction, thereby setting the lock mechanism 140 in the locking state as described above. The control assembly 150 may transmit to the motor an unlocking signal that causes the motor 146 to rotate the motor shaft 147 in the second direction, thereby setting the lock mechanism 140 in the unlocking state as described above. In certain embodiments, the control assembly 150 may selectively transmit the locking and unlocking signals based upon information received from the credential reader 160. In certain embodiments, the control assembly 150 may selectively transmit the locking and unlocking signals based upon information received from the external device 190.

In embodiments in which the trim assembly 100 includes the credential reader 160, the credential reader 160 may be mounted to the escutcheon 110. The credential reader 160 is configured to receive a credential input and to transmit to the control assembly 150 credential information relating to the credential input. In certain embodiments, the credential reader 160 may comprise one or more of the following: a keypad operable to receive credential input in the form of an input code; a card reader operable to receive credential input from a card; a fob reader operable to receive credential input from a fob; a mobile device reader operable to receive credential input from a mobile device 194; a biometric credential reader operable to scan or otherwise receive a biometric credential (e.g., a fingerprint scan, an iris scan, or a retina scan). It is also contemplated that the credential reader 160 may take another form, or may be omitted from the trim assembly 100. Moreover, it is also contemplated that the external credential reader 196 may be provided as one or more of the above-described forms of credential reader, and/or may take another form.

The mechanical lock mechanism 170 is operable to selectively connect the handle 120 to the drive spindle 130, and in the illustrated form comprises a lock cylinder 172, a cam 174 operable to be rotated by the lock cylinder 172, and a lock plate 176 engaged with the cam 174 and the moving wall 141. As is typical of lock cylinders, the lock cylinder 172 generally includes a shell, a plug rotatably mounted in the shell, and a tumbler system operable to selectively prevent rotation of the plug relative to the shell. The plug of the lock cylinder 172 is coupled with the cam 174 such that upon insertion of a proper key into the plug, the key is operable to rotate the plug to thereby rotate the cam 174.

One end of the cam 174 is coupled with the plug of the lock cylinder 172, and the opposite end of the cam 174 is engaged with the lock plate 176. For example, a projection 175 of the cam 174 may be received in a slot 177 of the lock plate 176. When the cam 174 is rotated, the projection 175 rides along the slot 177 and urges the lock plate 176 upward. The lock plate 176 is engaged with the movable wall 141 such that upward movement of the lock plate 176 drives the movable wall 141 upward to its unlocking position, thereby unlocking the trim 100. Upon return of the cam 174 to its home position, the lock plate 176 returns to its lower home position, thereby permitting the wall 141 to return to its lower locking position.

As noted above, certain embodiments may omit the electromechanical lock mechanism 140. In such forms, the mechanical lock mechanism 170 may include the moving wall 141 and the coupler 142 to retain the unlocking functionality of the mechanical lock mechanism 140. Moreover, while a particular embodiment of the electromechanical lock mechanism 140 and a particular embodiment of the mechanical lock mechanism 170 are illustrated and described herein, it is to be appreciated that the electromechanical lock mechanism 140 and/or the mechanical lock mechanism 170 may take another form. As one example, the electromechanical lock mechanism 140 may be provided as another form of electromechanical lock mechanism operable to selectively couple the handle 120 with the drive spindle 130, or a form of electromechanical lock mechanism operable to selectively prevent rotation of the handle 120. As another example, the mechanical lock mechanism 170 may be provided as another form of mechanical lock mechanism operable to selectively couple the handle 120 with the drive spindle 130, or a form of mechanical lock mechanism operable to selectively prevent rotation of the handle 120. Such electromechanical and mechanical lock mechanisms are known in the art, and need not be described in detail herein.

Figure 5:
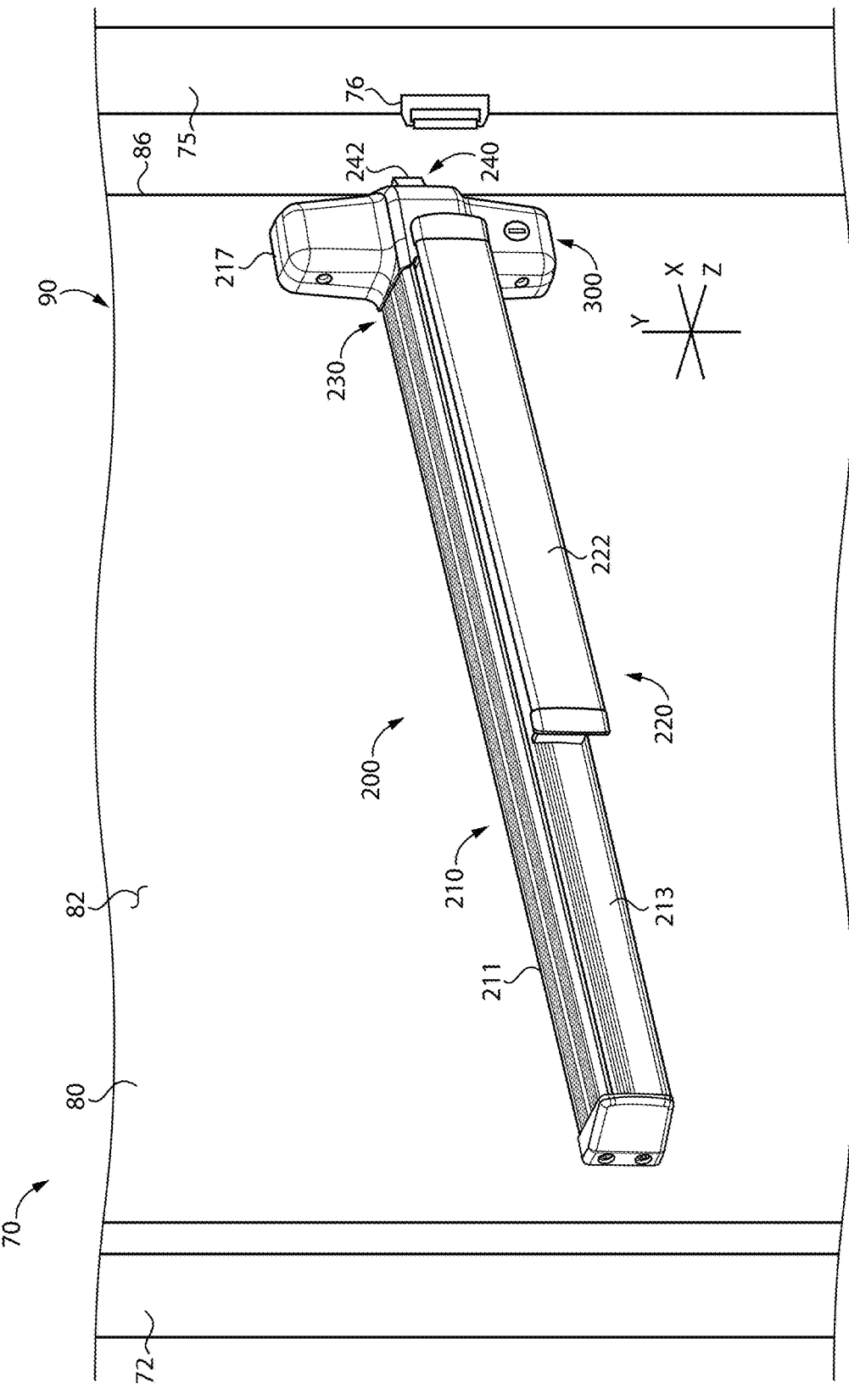
FIG. 5 is a perspective illustration of a pushbar assembly that may be utilized in the exit device assembly illustrated in FIG. 1.

With additional reference to FIG. 5, illustrated therein are certain features of a closure assembly 70 that generally includes the door 80 and the exit device assembly 90. The closure assembly 70 further includes a doorframe 72 on which the door 80 is swingingly mounted. The doorframe 72 includes a latch jamb 75 that is adjacent a free edge 86 of the door 80 when the door 80 is in its closed position. In the illustrated form, the closure assembly 70 further includes a strike 76, which is mounted to the latch jamb 75 and is operable to engage the latch mechanism 240 to selectively retain the door 80 in its closed position.

Figure 6:
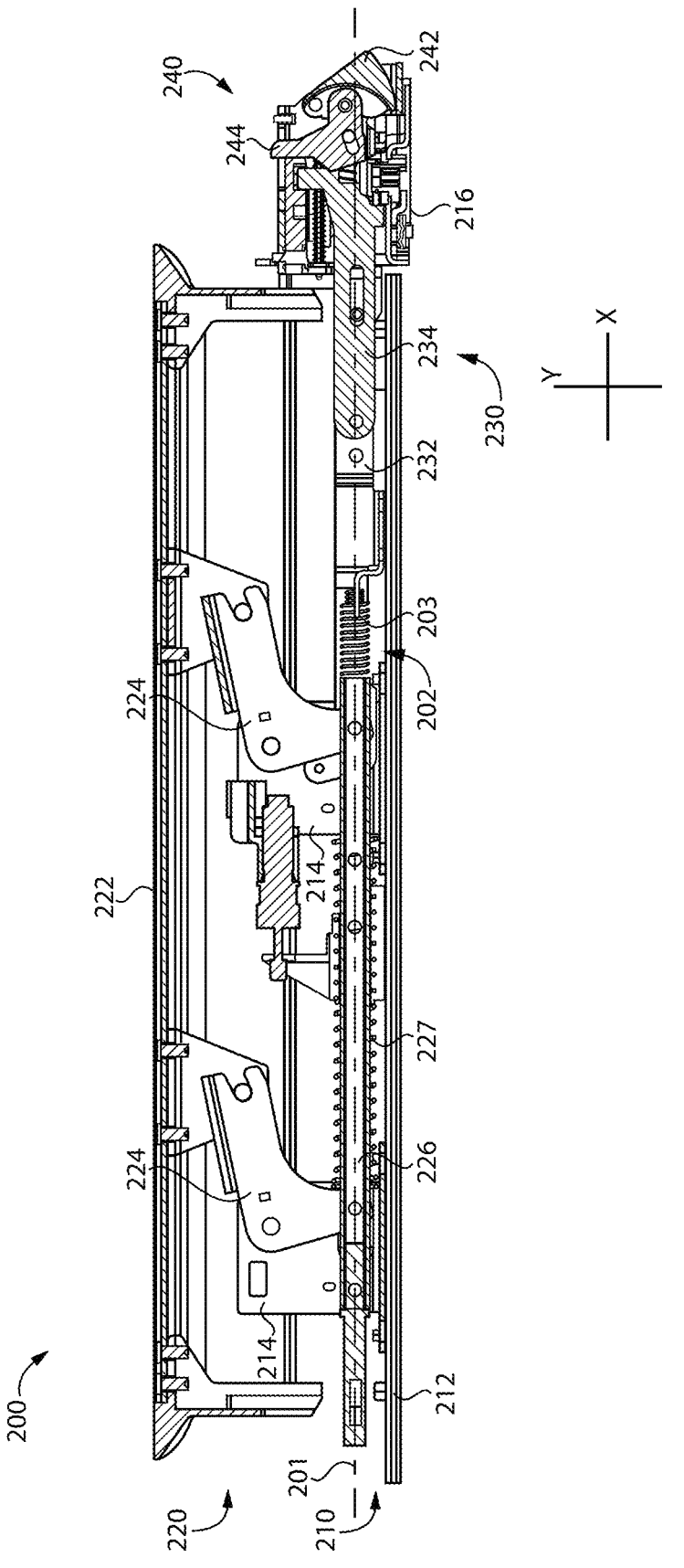
FIG. 6 is a cross-sectional illustration of a portion of the pushbar assembly illustrated in FIG. 5.

With additional reference to FIG. 6, the pushbar assembly 200 generally includes a mounting assembly 210, a drive assembly 220 movably mounted to the mounting assembly 210, a latch control assembly 230 operably coupled with the drive assembly 220, and an actuating device 250 operable to actuate the latch control assembly 230. In the illustrated form, the pushbar assembly 200 further includes the latch mechanism 240.

The mounting assembly 210 generally includes a longitudinally-extending channel member 211, a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216. As illustrated in FIG. 6, the channel member 211 extends along a longitudinal axis 201 of the pushbar assembly 200.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank brackets 214, and correlate the transverse movement of the pushbar 222 with longitudinal movement of the drive rod 226. More particularly, the bell cranks 224 cause the drive rod 226 to move between a proximal position (to the right in FIG. 6) and a distal position (to the left in FIG. 6) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the trim 100). As a result, the drive assembly 220 is operable to actuate the latch control assembly 230. The lost motion connection 202 may include a bias member such as a spring 203 urging the latch control assembly 230 toward a deactuated state thereof.

Figure 7:
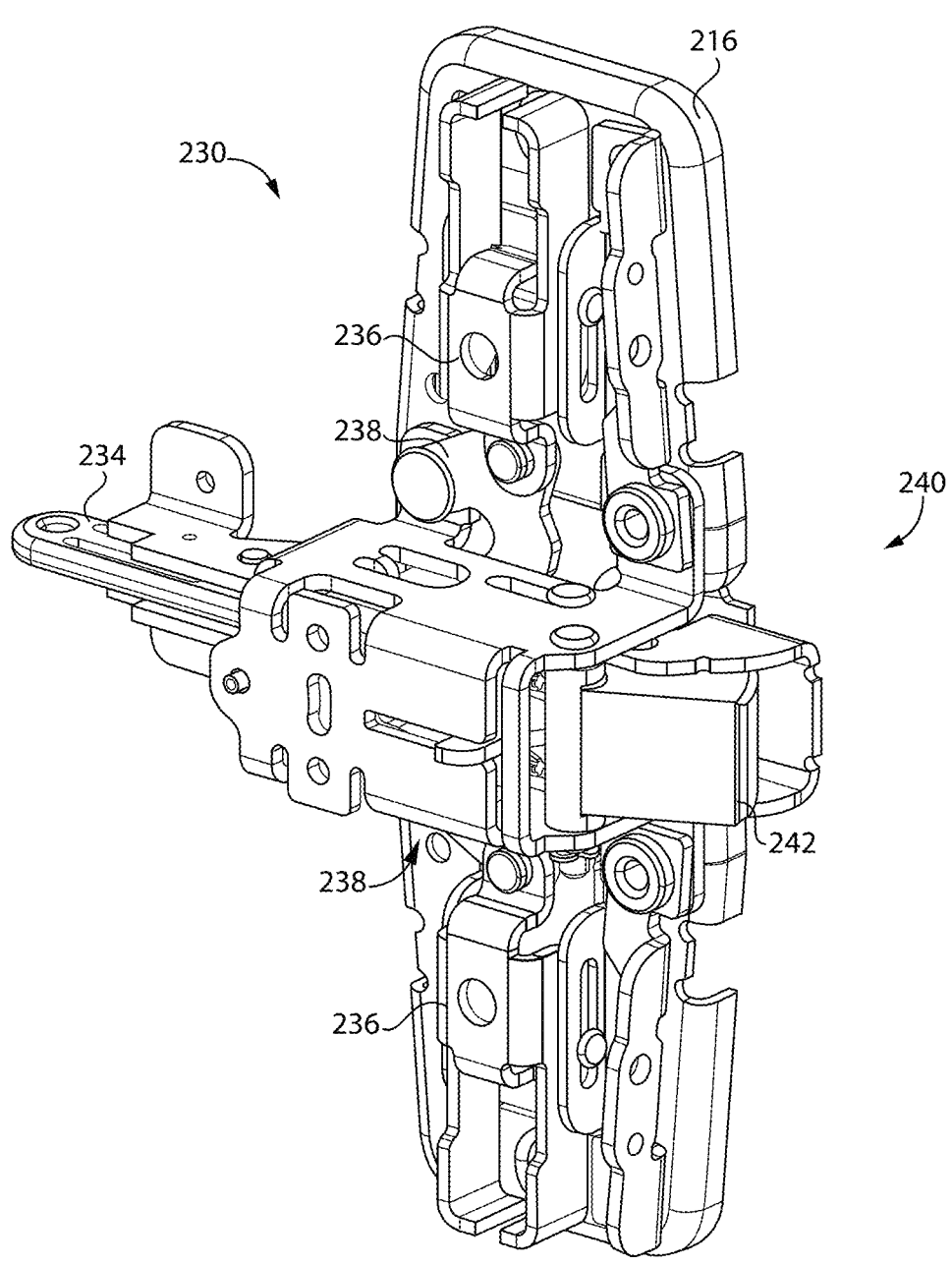
FIG. 7 is a perspective illustration of a portion of the pushbar assembly.

With additional reference to FIG. 7, the latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 316 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate longitudinal movement of the control link 232 and yoke 234 with lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the trim 100.

In the illustrated form, the latch mechanism 240 is installed in the header case 217, and engages the strike 75 when the door 80 is closed and the pushbar assembly 200 is deactuated. It is also contemplated that the exit device assembly 90 may include latch mechanisms in additional or alternative locations. As one example, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80.

Furthermore, while the illustrated latch mechanism 240 drives a latchbolt 242 between an extended position and a retracted position during actuation and deactuation of the latch mechanism 240, other forms of actuation are also contemplated for the latch mechanism 240. As one example, actuation of the latch mechanism may drive a blocking member from a blocking position to an unblocking position to permit retraction of a bolt without directly driving the bolt to the retracted position. In such forms, deactuation of the latch mechanism may tend to return the blocking member to the blocking position such that, when the bolt returns to its extended position, the blocking member once again retains the bolt in that extended position.

Figure 8:
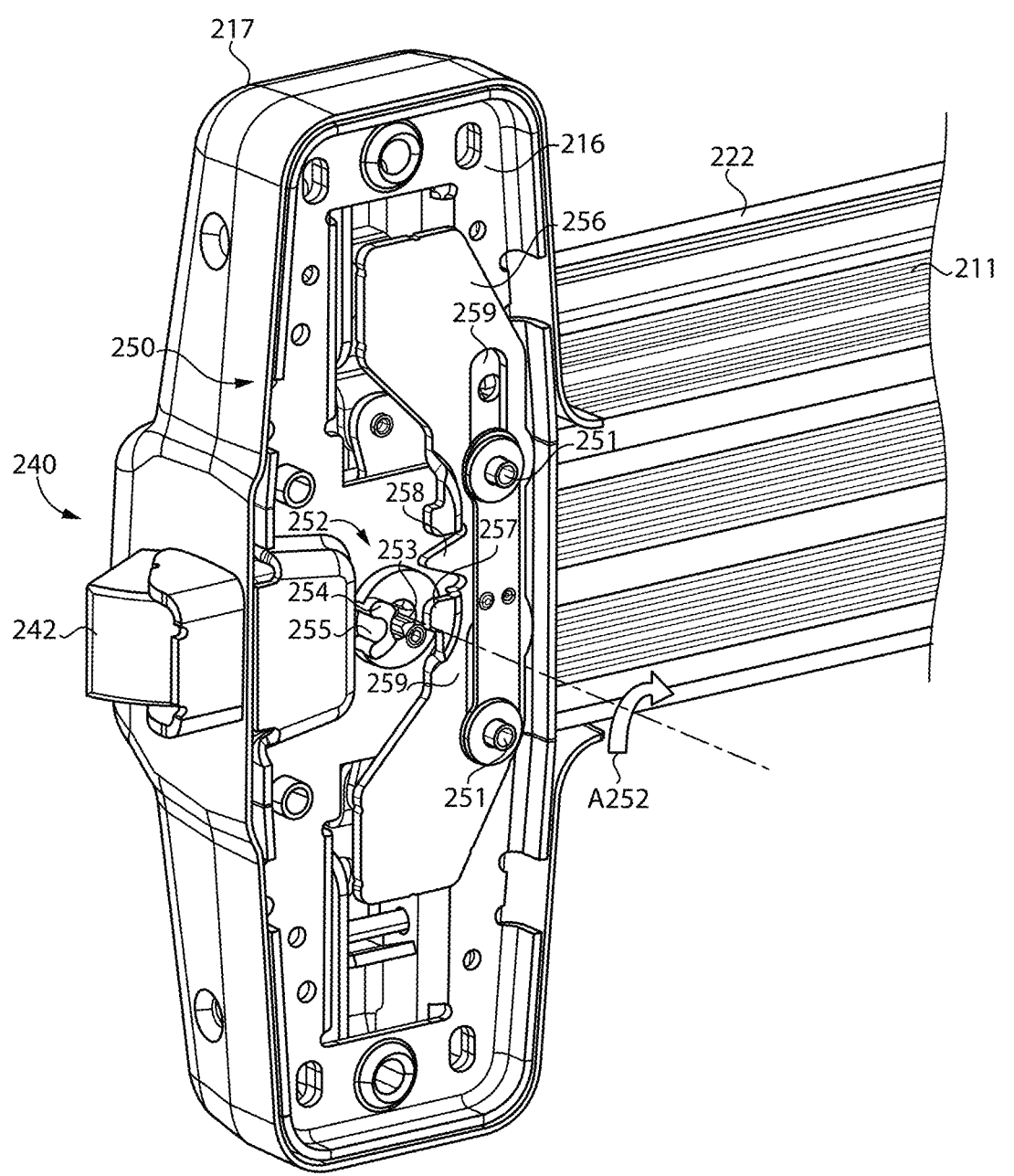
FIG. 8 is a perspective illustration of a portion of the pushbar assembly.

With additional reference to FIG. 8, the actuating device 250 generally includes an actuator 252 rotatably mounted to the header plate 216 and a slide plate 256 slidably mounted to the header plate 216 via a pair of lugs 251. The actuator 252 includes an aperture 253 sized and shaped to receive a tailpiece of the rotation converter 92, and further includes a projection 254 defining a recess 255. The slide plate 256 generally includes a protrusion 257, a finger positioned above the protrusion 257, and a pair of slots 259 that receive the lugs 251.

The actuating device 250 is configured to actuate the latch control assembly 230 in response to rotation of the actuator 252 in an actuator actuating direction A252 (clockwise in FIG. 8). Upon such rotation of the actuator 252, the projection 254 engages the protrusion 257, thereby urging the slide plate 256 downward as the finger 258 enters the recess 255. The slide plate 256 is engaged with the latch control assembly 230 such that downward movement of the slide plate 256 drives the upper driver 236 downward (i.e., in its laterally-inward actuating direction), thereby actuating the latch control assembly 230 and retracting the latchbolt 242. Thus, the first direction (i.e., the direction in which the actuator 252 is rotated to actuate the latch control assembly 230) may be referred to herein as the actuator actuating direction A252.

While the actuating device 250 is operable to actuate the latch control assembly 230 when the actuator 252 is rotated in the actuator actuating direction A252 (clockwise in FIG. 8), the actuating device 250 may be inoperable to actuate the latch control assembly 230 when the actuator 252 is rotated in a second direction opposite the actuator actuating direction A252. In such forms, the second direction may be referred to as the actuator non-actuating direction. In the illustrated form, when the actuator 252 is rotated in the actuator non-actuating direction (counter-clockwise in FIG. 8), the projection 255 engages the protrusion 257 and urges the slide plate 256 upward. However, upward movement of the slide plate 256 is prevented, for example by engagement of the lugs 251 with the ends of the slots 259. As such, the illustrated actuating device 250 is operable to actuate the latch control assembly 230 only when the actuator 252 is rotated in the actuator actuating direction A252, and not when the actuator 252 is rotated in the opposite direction.

As noted above, when the handle 120 is operably connected with the drive spindle 130, the handle 120 is operable to rotate the drive spindle 130 in each of a first direction and a second direction. If the drive spindle 130 were rotationally coupled with the actuator 252, rotating the handle in one direction would rotate the actuator 252 in the actuator actuating direction A252, while rotating the handle in the opposite direction would rotate the actuator 252 from the actuator home position in the actuator non-actuating direction. As such, the trim assembly 100 would only be able to actuate the latch control assembly 230 when the handle 120 is rotated in the correct direction. As described herein, however, the rotation converter 92 is configured to rotate the actuator 252 in the actuator actuating direction A252 in response to rotation of the drive spindle 130 in each and either direction.

Figure 9:
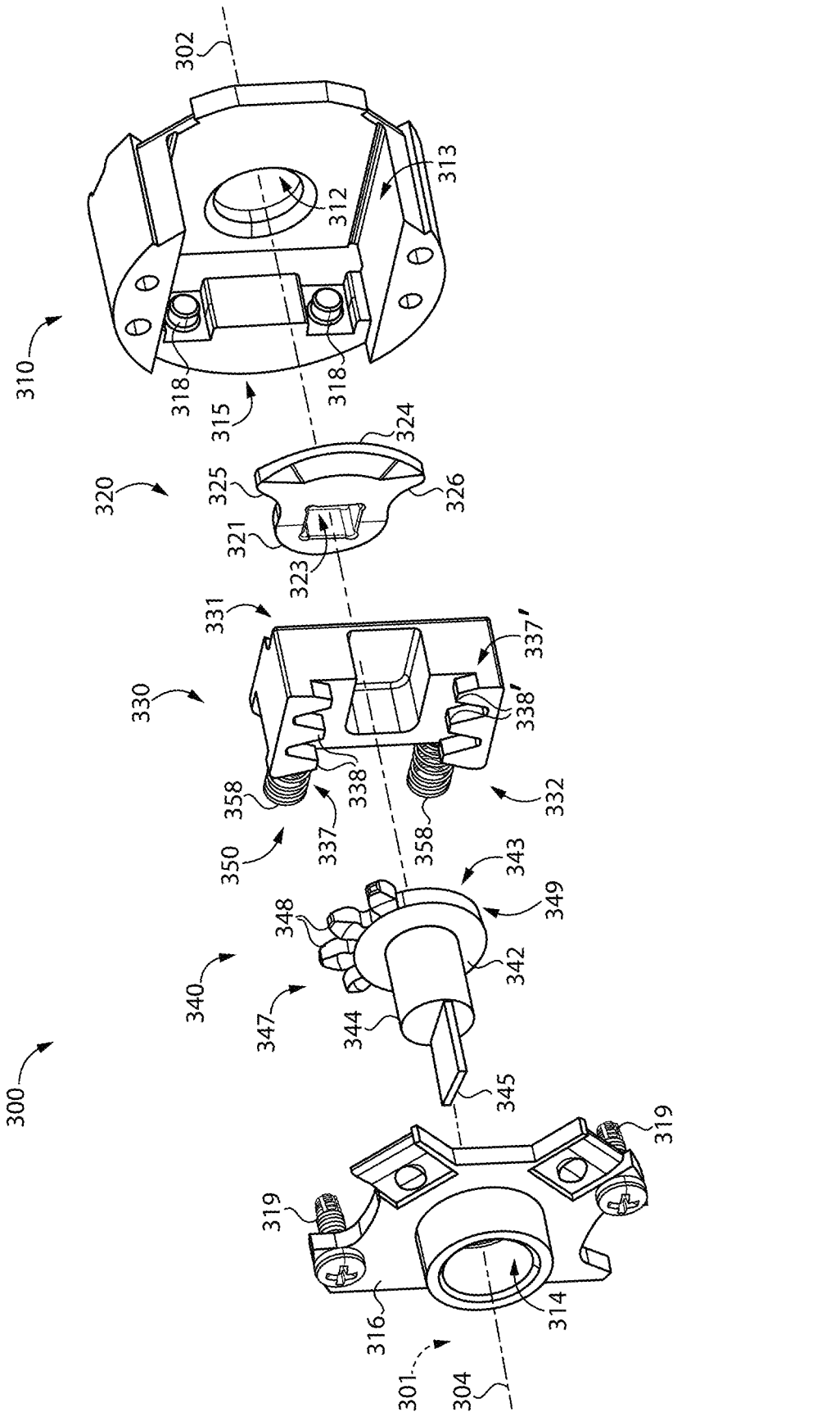
FIGS. 9 and 10 are exploded assembly views of a rotation converter according to certain embodiments, which may be utilized in the exit device assembly illustrated in FIG. 1.
Figure 10:
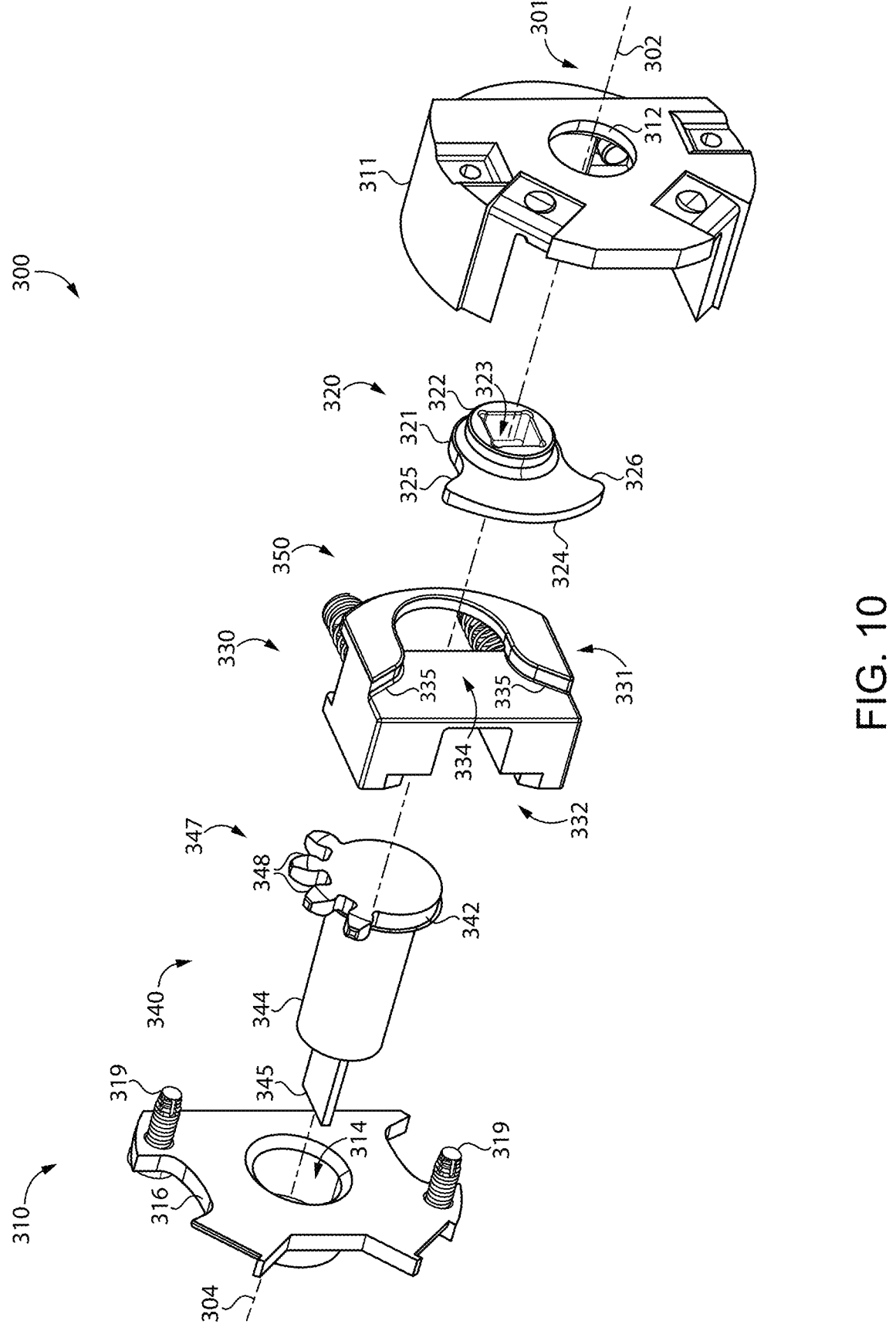

With additional reference to FIGS. 9 and 10, illustrated therein is a rotation converter 300 according to certain embodiments. The rotation converter 300 may, for example, be utilized as the rotation converter 92 of the exit device assembly 90. The illustrated rotation converter 300 is configured for mounting in the door preparation 85, and generally includes a case 310, an input member in the form of an input cam 320 rotatably mounted to the case 310, a shuttle 330 slidably mounted in the case 310 and engaged with the input cam 320, an output member 340 rotatably mounted to the case 310 and engaged with the shuttle 330, and a bias mechanism 350 urging the shuttle 330 toward a home position. As described herein, the input cam 320 is configured for connection with the drive spindle 130, the output member 340 is configured for connection with the actuator 252, and the shuttle 330 is configured to rotate the output member 340 in an output member actuating direction A340 in response to rotation of the input cam 320 in each and either of a first direction and a second direction. The rotation converter 300 has an input rotational axis 302 about which the input cam 320 rotates and an output rotational axis 304 about which the output member 340 rotates. In the illustrated form, the rotational axes 302, 304 are coincident and define a rotational axis 301 of the rotation converter 300. In other forms, the axes 302, 304 may not necessarily be coincident with each other.

The case 310 is configured for mounting in the door preparation 85, and generally includes a housing 311 and a cover plate 316. The housing 311 defines a first bearing aperture 312 centered about the input rotational axis 302, a receiving space 313 connected with the first bearing aperture 312, and a mounting area 315 positioned in the receiving space 313. The cover plate 316 includes a second bearing aperture 314 centered about the output rotational axis 304, and is coupled to the housing 311, for example by one or more threaded fasteners 319 such as screws. As described herein, the input cam 320 is rotatably supported by the first bearing aperture 312, the shuttle 330 is slidably mounted in the receiving space 313, the output member 340 is rotatably supported by the second bearing aperture 314, and the bias mechanism 350 is mounted in the mounting area 315 and engaged with the shuttle 330.

The input cam 320 generally includes a circular base plate 321, a bearing boss 322 projecting from the base plate 321, an aperture 323 sized and shaped to receive the drive spindle 130, and an car 324 projecting radially from the base plate 321. The bearing boss 322 is received in the first bearing aperture 312 such that the input cam 320 is rotatably supported by the housing 310 and is rotatable about the input rotational axis 302. In the illustrated form, the aperture 323 has a generally square geometry corresponding to the generally square geometry of the illustrated drive spindle 130. It is also contemplated that the drive spindle 130 and/or the aperture 323 may have a different geometry, so long as the input cam 320 is operable to engage the drive spindle 130. The car 324 includes a first engagement portion 325 and a second engagement portion 326 angularly spaced from the first engagement portion 325. As described herein, each of the engagement portions 325, 326 is operable to engage the shuttle 330 to linearly drive the shuttle 330 in response to rotation of the input cam 320.

The shuttle 330 is slidably seated in the receiving space 313 for movement between a shuttle home position and a shifted or shuttle actuated position, and includes an input side 331 engaged with the input cam 320 and an output side 332 engaged with the output cam 340. The input side 331 includes a recessed portion 314 in which the input cam 320 is seated. The recessed portion 334 includes a first cam surface 335 operable to be engaged by the first engagement portion 325 and a second cam surface 336 operable to be engaged by the second engagement portion 326. The output side 332 includes a rack gear 337 comprising one or more teeth 338, and in the illustrated form further comprises a second rack gear 337'. The second rack gear 337' is positioned opposite the first rack gear 337 and comprises one or more teeth 338'.

The output member 340 generally includes a base plate 342 and a bearing post 344 extending from the base plate 342, and may further include a tailpiece 345 extending from the post 344. The bearing post 344 extends into the second bearing aperture 314 such that the output cam 340 is rotatably supported by the housing 310 and is rotatable about the output rotational axis 304. The base plate 342 defines a partially toothed pinion gear 343 including a toothed region 347 engaged with the rack gear 337 to form a rack-and-pinion device 307. The toothed region 347 includes one or more teeth 348 engaged with the one or more teeth 338 of the rack gear 337. The partially-toothed pinion gear 343 further includes an untoothed region 349 that faces the second rack gear 337' without engaging the second rack gear 337'.

The tailpiece 345 is configured for rotational coupling with the actuator 252 of the actuating device 250, and in the illustrated form is integrally formed with or otherwise coupled to the post 344. It is also contemplated that the post 344 may be engaged with the tailpiece 345 in another manner. For example, the post 344 may include a slot or recess in which a portion of the tailpiece 345 is seated such that the post 344 and the tailpiece 345 are engaged with one another. In such forms, the post 344 and the tailpiece 345 may be longitudinally decoupled from one another to allow for sliding movement of the tailpiece 345 along the output rotational axis 304. It is also contemplated that the output member 340 may be engaged with the tailpiece 345 in another manner. By way of illustration, the output member 340 may be engaged with the tailpiece 345 via a removable adapter, for example as described herein with reference to FIGS. 25-27.

The bias mechanism 350 is seated in the mounting area 315 and is engaged between the housing 310 and the shuttle 330 such that the bias mechanism 350 biases the shuttle 330 toward the shuttle home position. In the illustrated form, the bias mechanism 350 includes two bias members in the form of compression springs 358. The mounting area 315 may include a pair of lugs 318 on which the compression springs 358 are mounted, and the shuttle 330 may include a pair of recesses into which the springs 358 extend. While the illustrated bias mechanism 350 includes two bias members, it is also contemplated that more or fewer bias members may be utilized. Moreover, while the illustrated bias members are provided in the form of compression springs 358, it is also contemplated that one or more bias members of the bias mechanism 350 may be provided in another form. For example, the bias mechanism 350 may include one or more of the following: an extension spring, a torsion spring, a leaf spring, an elastic member, one or more magnets, and/or other forms of bias members.

Figure 11:
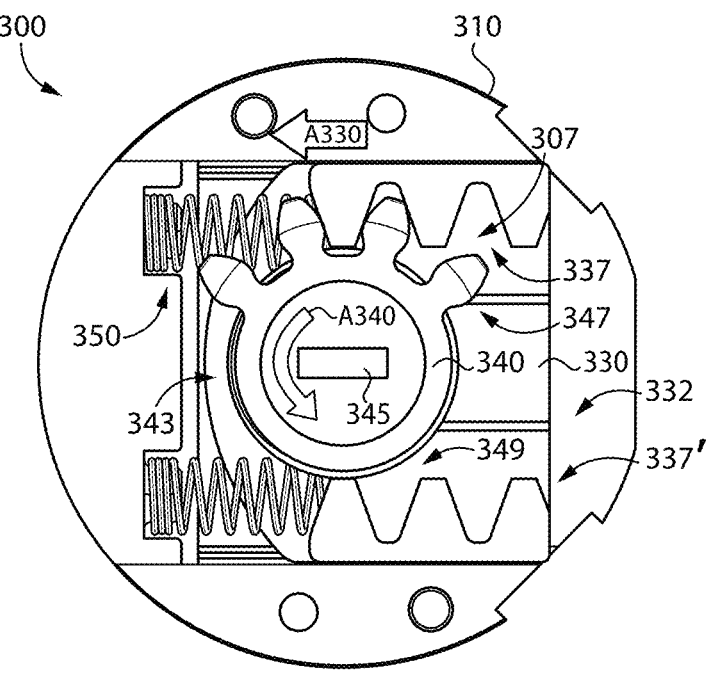
FIG. 11 is a plan view of a portion of the rotation converter illustrated in FIGS. 9 and 10 while in a deactuated state.
Figure 12:
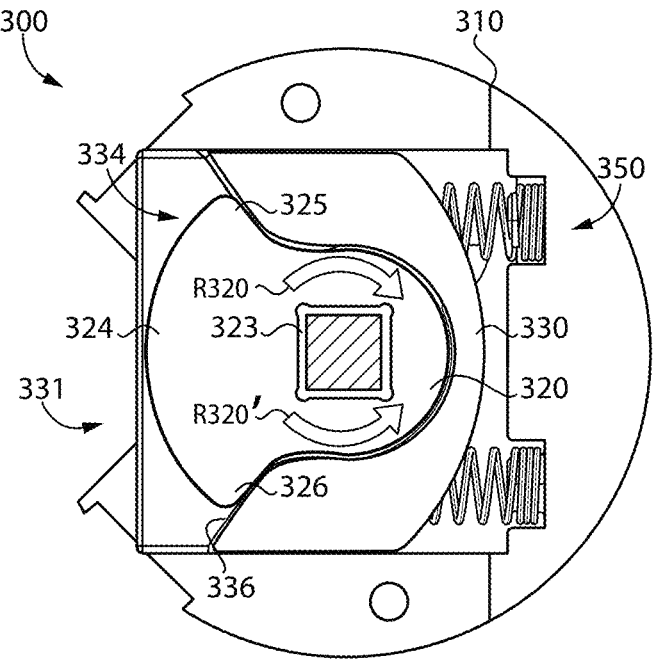
FIG. 12 is a plan view of a portion of the rotation converter illustrated in FIGS. 9 and 10 while in the deactuated state.

With additional reference to FIGS. 11 and 12, illustrated therein is the rotation converter 300 in a deactuated state. In this state, each of the input cam 320, the shuttle 330, and the output cam 340 is in its corresponding and respective home position. This deactuated state of the rotation converter 300 corresponds to the deactuated state of the trim assembly 100, in which each of the handle 120 and the drive spindle 130 is in its corresponding and respective home position. The rotation converter 300 is biased toward its deactuated state at least in part by the bias mechanism 350, which urges the shuttle 330 toward its home position. Biasing of the shuttle 330 toward its home position results in biasing of the input cam 320 toward its home position due to engagement of at least one of the cam surfaces 335, 336 with its corresponding engagement portion 325, 326. Biasing of the shuttle 330 toward its home position also results in biasing of the output member 340 toward its home position due to engagement of the rack gear 337 with the toothed region 347 of the pinion gear 343.

Figure 13:
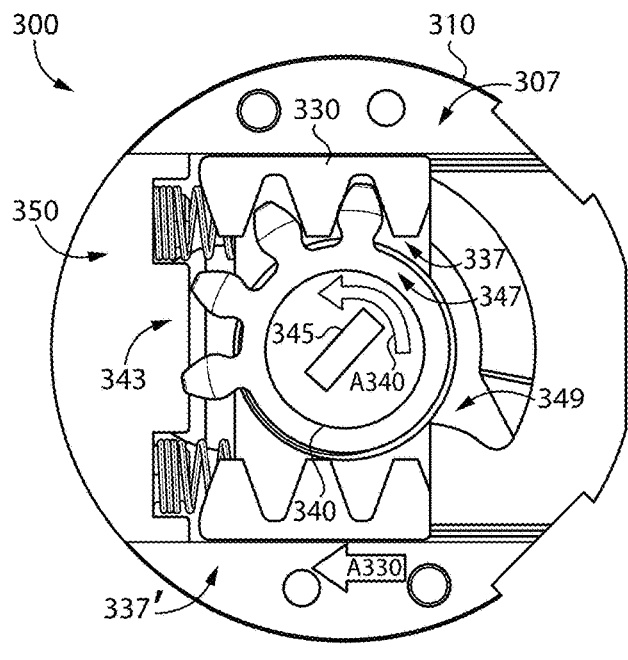
FIG. 13 is a plan view of a portion of the rotation converter illustrated in FIGS. 9 and 10 while in an actuated state.

With additional reference to FIG. 13, illustrated therein is a rear plan view of the rotation converter 300 in its actuated state. In this state, the shuttle 330 has been shifted to its actuated or shifted position, resulting in rotation of the output member 340 to its actuated or rotated position. More particularly, shifting of the shuttle 330 to its actuated position causes the engaged rack gear 337 and pinion 343 to rotate the output member 340 in the output member actuating direction A340, which in the illustrated embodiment is the same as the actuator actuating direction A252. Due to the fact that the output member 340 is operably connected with the actuator 252 (e.g., via the tailpiece 345), such rotation of the output member 340 in its actuating direction A340 causes a corresponding rotation of the actuator 252 in its actuating direction A252, thereby actuating the latch control assembly 230 as described above. Thus, actuation of the rotation converter 300 causes a corresponding actuation of the latch control assembly 230.

Figures 14, 15:
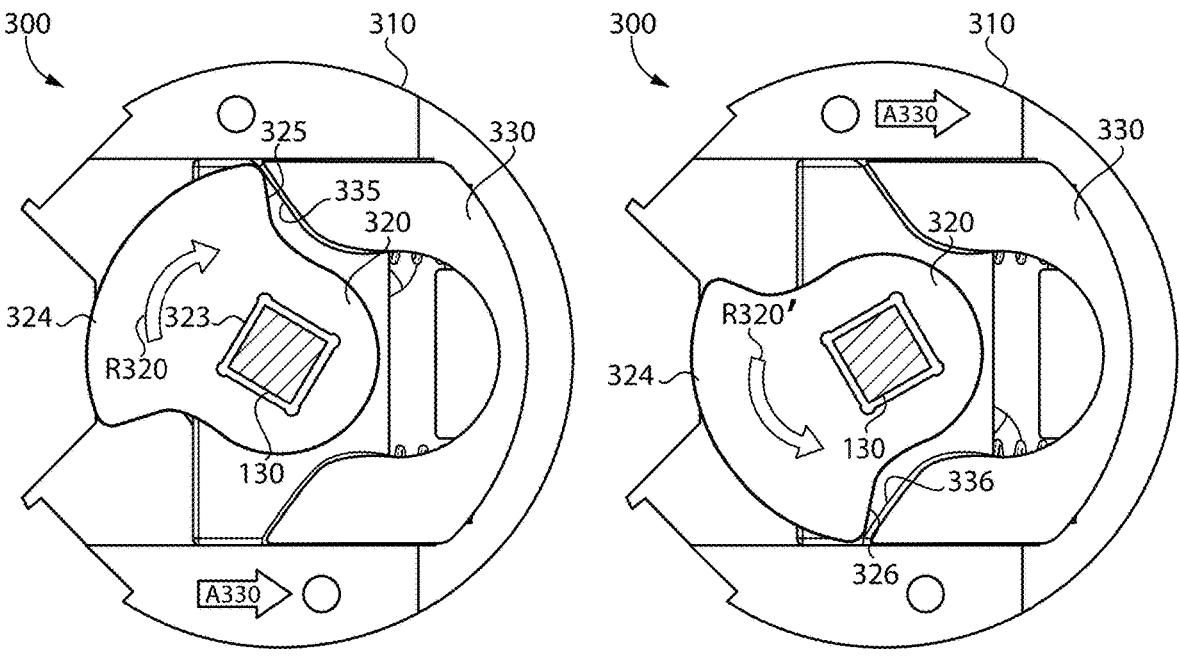
FIG. 14 is a plan view of a portion of the rotation converter illustrated in FIGS. 9 and 10 while in a first actuated state.
FIG. 15 is a plan view of a portion of the rotation converter illustrated in FIGS. 9 and 10 while in a second actuated state.

With additional reference to FIG. 14, the rotation converter 300 can be actuated by causing rotation of the input cam 320 in an input cam first rotational direction R320 (clockwise in FIG. 14) from the input cam home position (FIG. 12) to an input cam first rotational position (FIG. 14). The input cam 320 may, for example, be rotated in the input cam first rotational direction R320 by rotating the handle 120 in a handle first rotational direction while the handle 120 is engaged with the drive spindle 130. Such rotation of the handle 120 in the handle first rotational direction causes a corresponding rotation of the drive spindle 130 in a drive spindle first rotational direction, thereby rotating the input cam 320 in the input cam first rotational direction R320. Rotation of the input cam 320 in the input cam first rotational direction R320 (clockwise in FIG. 14) causes the first engagement portion 325 of the input cam 320 to engage the first cam surface 335 of the shuttle 330 such that the input cam 320 drives the shuttle 330 in the shuttle actuating direction A330 (to the left in FIGS. 11 and 13, to the right in FIGS. 12 and 14). Shifting of the shuttle 330 in the shuttle actuating direction A330 causes a corresponding rotation of the output member 340 in the output member actuating direction A340, thereby actuating the latch control assembly 230 as described above. Thus, the rotation converter 300 converts rotation of the input cam 320 from the input cam home position in the input cam first rotational direction R320 to rotation of the output member 340 in the output member actuating direction A340.

With additional reference to FIG. 15, the rotation converter 300 can also be actuated by causing rotation of the input cam 320 in an input cam second rotational direction R320' (counter-clockwise in FIG. 15) from the input cam home position (FIG. 12) to an input cam second rotational position (FIG. 15). The input cam 320 may, for example, be rotated in the input cam second rotational direction R320' by rotating the handle 120 in a handle second rotational direction while the handle 120 is engaged with the drive spindle 130. Such rotation of the handle 120 in the handle second rotational direction causes a corresponding rotation of the drive spindle 130 in a drive spindle second rotational direction, thereby rotating the input cam 320 in the input cam second rotational direction R320'. Rotation of the input cam 320 in the input cam second rotational direction R320'

(counter-clockwise in FIG. 15) causes the second engagement portion 326 of the input cam 320 to engage the second cam surface 336 of the shuttle 330 such that the input cam 320 drives the shuttle 330 in the shuttle actuating direction A330 (to the left in FIGS. 11 and 13, to the right in FIGS. 12 and 15). Shifting of the shuttle 330 in the shuttle actuating direction A330 causes a corresponding rotation of the output member 340 in the output member actuating direction A340, thereby actuating the latch control assembly 230 as described above. Thus, the rotation converter 300 converts rotation of the input cam 320 from the input cam home position in the input cam second rotational direction R320' to rotation of the output member 340 in the output member actuating direction A340.

Regardless of whether the drive spindle 130 has been rotated from the home position in the first drive spindle direction or the second drive spindle direction, the drive spindle 130 may return to the drive spindle home position after driving the shuttle 330 to the shuttle actuated position. Such return of the drive spindle 130 to the drive spindle home position causes a corresponding return of the input cam 320 to the input cam home position. As the input cam 320 returns to its home position, the bias mechanism 350 urges the shuttle 330 in a shuttle deactuating direction opposite the shuttle actuating direction A330. As the shuttle 330 moves in the shuttle deactuating direction, the rack-and-pinion mechanism 307 returns the output member 340 to the output member home position, thereby returning the actuator 252 to the actuator home position and deactuating the latch control assembly 230. Thus, the rotation converter 300 converts rotation of the input cam 320 toward the input cam home position to rotation of the actuator 252 toward the actuator home position.

As should be appreciated from the foregoing, the rotation converter 300 is configured to convert rotation of the input cam 320 in each and either direction from the input cam home position (i.e., each and either of the input cam first rotational direction R320 and the input cam second rotational direction R320') into rotation of the output member 340 in a single actuating direction A340. This capability may be referred to herein as the capability of converting bidirectional rotation to unidirectional rotation. With this capability, regardless of whether the drive spindle 130 is rotated from the drive spindle home position in the drive spindle first rotational direction (e.g., counter-clockwise in FIG. 2) or the drive spindle second rotational direction (e.g., clockwise in FIG. 2), the output of the rotation converter 300 will be the same. More particularly, the output of the rotation converter 300 will be an output that rotates the actuator 252 in its actuating direction A252 from the actuator home position to the actuator actuated position. As a result, the handle 120 can be installed in either of a left-handed orientation or a right-handed orientation, and when the handle 120 is coupled with the drive spindle 130, the handle 120 can be rotated in either direction from the handle home position to actuate the latch control assembly 230.

In the illustrated form, when the handle 120 is engaged with the drive spindle 130, the handle 120, the drive spindle 130, and the input cam 320 are operably coupled such that each of the first directions is the same direction, and each of the second directions is the same direction. For example, the handle first rotational direction (counter-clockwise in the orientation of FIG. 2) is the same as the drive spindle first rotational direction (counter-clockwise in the orientation of FIG. 2 and clockwise in the orientation of FIG. 14), which is the same as the input cam first rotational direction (clockwise in the orientation of FIG. 14). Similarly, the handle second rotational direction (clockwise in the orientation of FIG. 2) is the same as the drive spindle second rotational direction (clockwise in the orientation of FIG. 2 and counter-clockwise in the orientation of FIG. 14), which is the same as the input cam second rotational direction (counter-clockwise in the orientation of FIG. 14). It is also contemplated that one or more of the components may rotate in an opposite direction as one or more of the other components. For example, should the handle 120 be engaged with the drive spindle 130 via one or more gears, the drive spindle 130 may rotate in an opposite direction as the handle 120. In such forms, the handle first rotational direction (e.g. clockwise in the orientation of FIG. 2) may be different from the drive spindle first direction (e.g., counter-clockwise in the orientation of FIG. 2).

In the configuration illustrated in FIGS. 11 and 13, the output member 340 is installed in a first orientation, in which the toothed region 347 engages the rack gear 337 and the untoothed region 349 faces the second rack gear 337' without engaging the second rack gear 337'. As a result, movement of the shuttle 330 in the shuttle actuating direction A330 (to the left in FIGS. 11 and 13) causes a corresponding rotation of the output member 340 in an output member first actuating direction A340 (counter-clockwise in FIG. 11).

Figure 16:
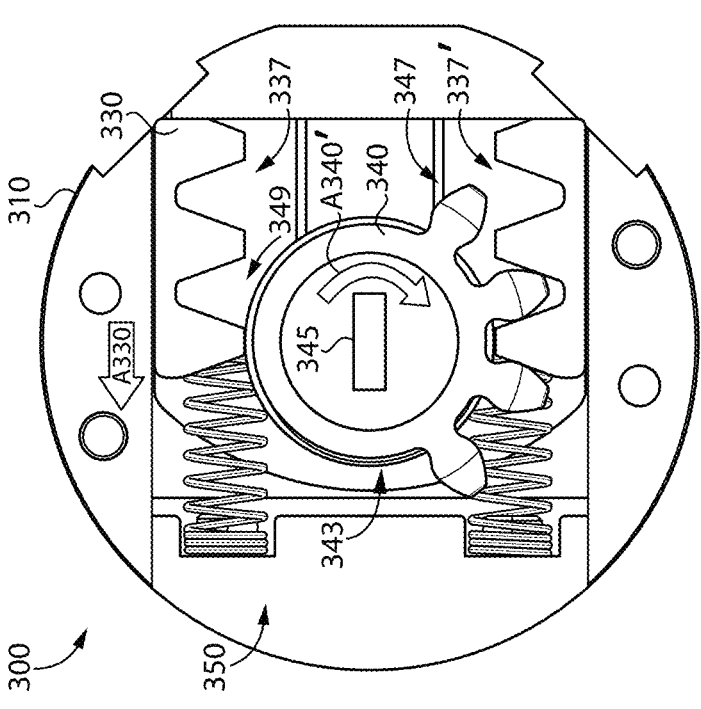
FIG. 16 is a plan view of a portion of the rotation converter illustrated in FIGS. 9 and 10 with an output member in a reversed orientation.

With additional reference to FIG. 16, illustrated therein is the rotation converter 300 with the output member 340 installed in a second orientation opposite the first orientation. More particularly, the second orientation is about 180° offset from the first orientation about the output rotational axis 304. In this second or reversed orientation, the toothed region 347 engages the second rack gear 337' and the untoothed region 349 faces the rack gear 337 without engaging the first rack gear 337. As a result, movement of the shuttle 330 in the shuttle actuating direction A330 (to the left in FIG. 16) causes a corresponding rotation of the output member 340 in an output member second actuating direction A340' (clockwise in FIG. 16).

As should be evident from the foregoing, the illustrated output member 340 is reversible to alter the output member actuating direction. Such reversibility may be advantageous to the installer. For example, while the actuating device 250 of the illustrated pushbar assembly 200 is configured to actuate the latch control assembly 230 when the actuator 252 is rotated in a first rotational direction (counter-clockwise in FIG. 8), it is also contemplated that a pushbar assembly may include an actuating device that actuates a latch control assembly when an actuator is rotated in a second rotational direction opposite the first rotational direction. In such forms, the same rotation converter 300 may be utilized to rotate the output member 340 in the second rotational direction. More particularly, the cover plate 316 may be removed to expose the output member 340, the output member 340 may be removed and replaced in the second orientation, and the cover plate 316 may be reinstalled to close the housing 300. With the output member 340 in the reversed orientation, the rotation converter 300 will be configured to convert bidirectional rotation to unidirectional rotation in the second rotational direction A340'.

In the illustrated form, the output member 340 is reversible between the first and second orientations to alter the output member actuating direction as described above. It is also contemplated that the output member 340 may not necessarily be reversible. By way of example, one of rack gears 337, 337' may be omitted. In such forms, the pinion gear 343 may be fully toothed, or may remain partially toothed. Moreover, while rehanding the illustrated rotation converter 300 involves opening the case 310 and removing the output member 340 from the case 310, other embodiments of rotation adapters may be operable to be rehanded without removing the output member from the case, for example as described below with reference to the rotation converters 500, 600.

Figure 17:
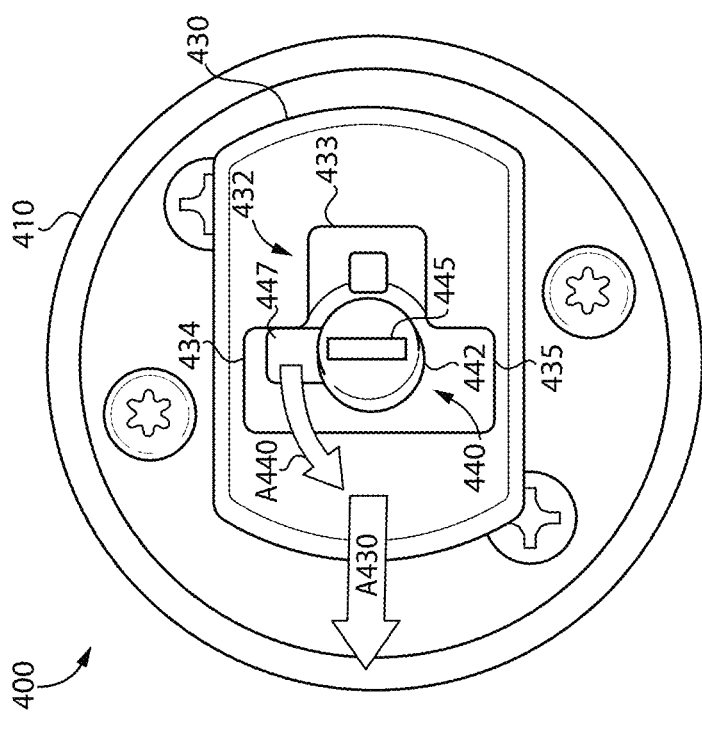
FIG. 17 is a plan view of a rotation converter according to certain embodiments, which may be utilized in the exit device assembly illustrated in FIG. 1.

With additional reference to FIG. 17, illustrated therein is a rotation converter 400 according to certain embodiments. The rotation converter 400 may, for example, be utilized as the rotation converter 92 of the exit device assembly 90. The rotation converter 400 is substantially similar to the above-described rotation converter 300, and generally includes a housing 410, an input cam, a shuttle 430, an output member 440, and a bias mechanism, which respectively correspond to the above-described housing 310, input cam 320, shuttle 330, output member 340, and bias mechanism 350. In the interest of conciseness, the following description of the rotation converter 400 focuses primarily on elements and features that are different from those described above with reference to the rotation converter 300.

As with the above-described shuttle 330, the shuttle 430 has a shuttle home position (illustrated in FIG. 17), and is movable in a shuttle actuating direction A430 toward a shuttle actuated position. Actuation of the shuttle 430 may, for example, take place along the lines set forth above with reference to actuation of the shuttle 330. The shuttle 430 includes an aperture 432 that includes a first recess 433 and a second recess 434 extending away from the first recess 433 at a right angle, and which in the illustrated form further includes a third recess 435 opposite the second recess 434. As described herein, the aperture 432 receives the output member 440 and aids in rotating the output member 440 in the output member actuating direction as the shuttle 430 is driven in the shuttle actuating direction A430.

The output member 440 is somewhat similar to the above-described output member 340, and generally includes a base plate 442, a post extending from the base plate 442, and a tailpiece 445 extending from the post. However, in place of the toothed region 347, the illustrated output member 440 includes a radial projection 447 that extends into the second recess 434.

As should be appreciated, the shuttle 430 can be driven in the shuttle actuating direction A430 by rotation of the input cam in either direction from the input cam home position, for example as described above with reference to the input cam 320 and the shuttle 330. During movement of the shuttle 430 in the shuttle actuating direction A430, one edge of the second recess 434 (the right edge in FIG. 17) engages the radial projection 447, thereby driving the output member 440 in the output member actuating direction A440 (counter-clockwise in FIG. 17) as the base plate 442 enters the first recess 433. Such rotation of the output member 440 in the output member actuating direction A440 from the output member home position drives the actuator 252 from the actuator home position to the actuator actuated position, thereby actuating the latch control assembly 230 as described above. As the input cam returns to the input cam home position (e.g., in response to rotation of the drive spindle 130 to the drive spindle home position), a second edge of the second recess (the left edge in FIG. 17) engages the radial projection, thereby returning the output member 440 to the output member home position. Such return of the output member 440 to the output member home position causes a corresponding return of the actuator 252 to the actuator home position, thereby deactuating the latch control assembly 230 as described above.

In the illustrated form, the output member 440 is reversible in a manner analogous to that described above with reference to the output member 430. More particularly, the output member 440 can be removed from the rotation converter 400, rotated by about 180° about its rotational axis, and reinstalled to the rotation converter 400 such that the radial projection 447 extends into the third recess 435. With the output member 440 installed in this second orientation, movement of the shuttle 430 in the shuttle actuating direction A430 drives the output member 440 in an output member second actuating direction (clockwise in FIG. 17) opposite the output member first actuating direction A440 (counter-clockwise in FIG. 17). The ability to alter the actuating direction of the output member 440 may be advantageous for reasons analogous to those set forth above with reference to the reversibility of the output member 340.

Figure 18:
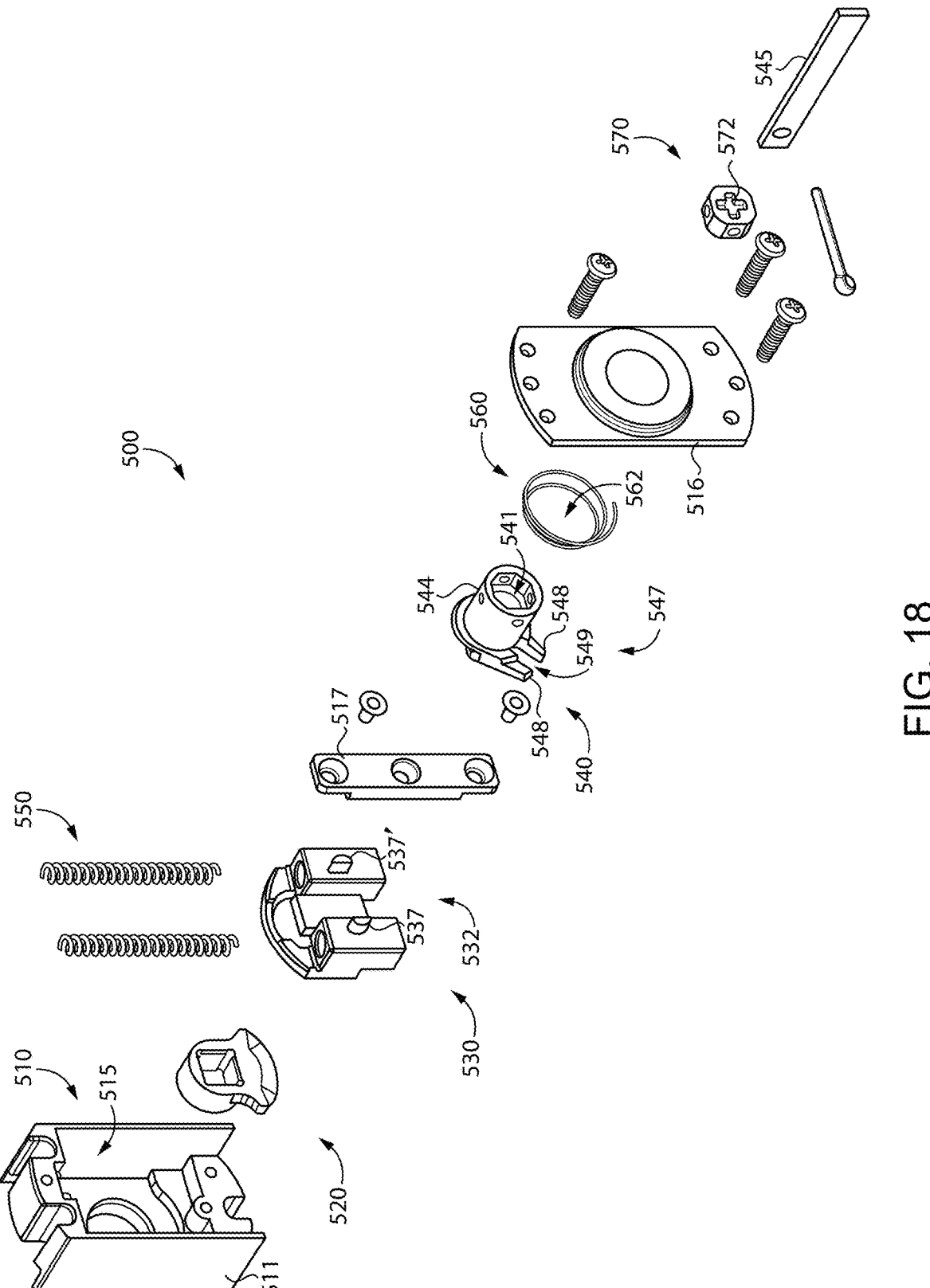
FIG. 18 is an exploded assembly view of a rotation converter according to certain embodiments, which may be utilized in the exit device assembly illustrated in FIG. 1.

With additional reference to FIG. 18, illustrated therein is a rotation converter 500 according to certain embodiments. The rotation converter 500 may, for example, be utilized as the rotation converter 92 of the exit device assembly 90. The rotation converter 500 is similar to the above-described rotation converter 300, and similar reference characters are used to indicate similar elements and features except where noted otherwise. For example, the rotation converter 500 generally includes a case 510, an input member in the form of an input cam 520, a shuttle 530, an output member 540, and a bias mechanism 550, which respectively correspond to the case 310, the input cam 320, the shuttle 330, the output member 340, and the bias mechanism 350. As described herein, the rotation converter 500 further includes a second bias mechanism 560 biasing the output member 540 toward an engaged position, and the output member 540 is coupled with the tailpiece 545 via an adapter 570. In the interest of conciseness, the following description of the rotation converter 500 focuses primarily on elements and features that are different from those described above with reference to the rotation converter 300. It should nonetheless be understood that features described in association with one embodiment of rotation converter may be utilized in connection with another embodiment of rotation converter.

In the illustrated form, the case 510 is relatively narrow, and may facilitate mounting of the rotation converter 500 in doors having a narrow stile. The case 510 generally includes a housing 511 and a cover plate 516 configured for coupling with the housing 511 to define a mounting area 515. The illustrated case 510 further includes a support plate 517 that supports the shuttle 530 and aids in restricting the shuttle 530 to linear movement between its home position and its actuated position. The input cam 520 is rotatably mounted to the case 510, the shuttle 530 is slidably mounted in the case 510, and the bias mechanism 550 biases the shuttle 530 toward the shuttle home position in a manner analogous to that described above with reference to the rotation converter 300.

In the illustrated form, the output side 532 of the shuttle 530 includes a first lug 537 in lieu of the rack gear 337, and may further include a second lug 537' in lieu of the second rack gear 337. Additionally, the output member 540 includes an engagement section 547 including a pair of prongs 548 and a recess 549 defined between the prongs 548. Each of the lugs 537, 537' is operable to be received in the recess 549 to define a handing configuration of the rotation converter 500. In the illustrated form, the first lug 537 is received in the recess 549, thereby providing the rotation converter 500 with a first handing configuration. As described herein, the illustrated rotation converter 500 can be changed to a second handing configuration in which the second lug 537' is received in the recess 549 by selectively moving the output member 540 against the force of the second bias mechanism 560 to a disengaged position in which the engagement section 547 is disengaged from the lugs 537, 537'.

The second bias mechanism 560 biases the output member 540 into engagement with the shuttle 530. In the illustrated form, the bias mechanism 560 is provided as a frustoconical compression spring that defines an opening 562 through which the bearing post 544 of the output member 540 extends. It is also contemplated that the bias mechanism 560 may include additional or alternative bias members to bias the output member 540 into engagement with the shuttle 530, such as a torsion spring, an extension spring, a leaf spring, an clastic member, and/or one or more magnets.

As with the above-described output member 340, the illustrated output member 540 is operably connected with a tailpiece 545. In the illustrated form, however, the output member 540 is connected with the tailpiece 545 via an adapter 570, which is seated in a recess 541 formed in the bearing post 544 of the output member 540. The inner geometry of the recess 541 corresponds to the outer geometry of the adapter 570 such that the output member 540 and the adapter 570 are rotationally coupled with one another when the adapter 570 is seated in the recess 541.

Additionally, the adapter 570 includes an opening 572 in which an end portion of the tailpiece 545 is received such that rotation of the output member 540 during actuation of the rotation converter 500 causes a corresponding rotation of the tailpiece 545. In the illustrated form, the opening 572 is configured to closely receive the tailpiece 545 for rotational coupling of the output member 540 and the tailpiece 545. As described herein, it is also contemplated that the opening 572 may have another geometry such that a lost rotational motion coupling is formed between the output member 540 and the tailpiece 545.

Figure 20:
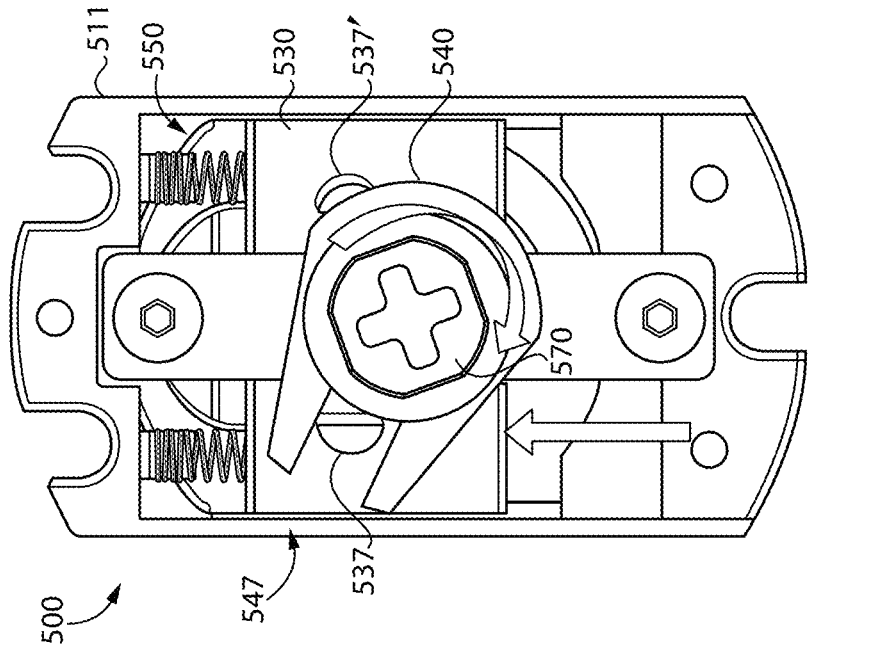
FIG. 20 is a plan view of the rotation converter illustrated in FIG. 18 while in an actuated state.
Figure 20:
Figure 19:
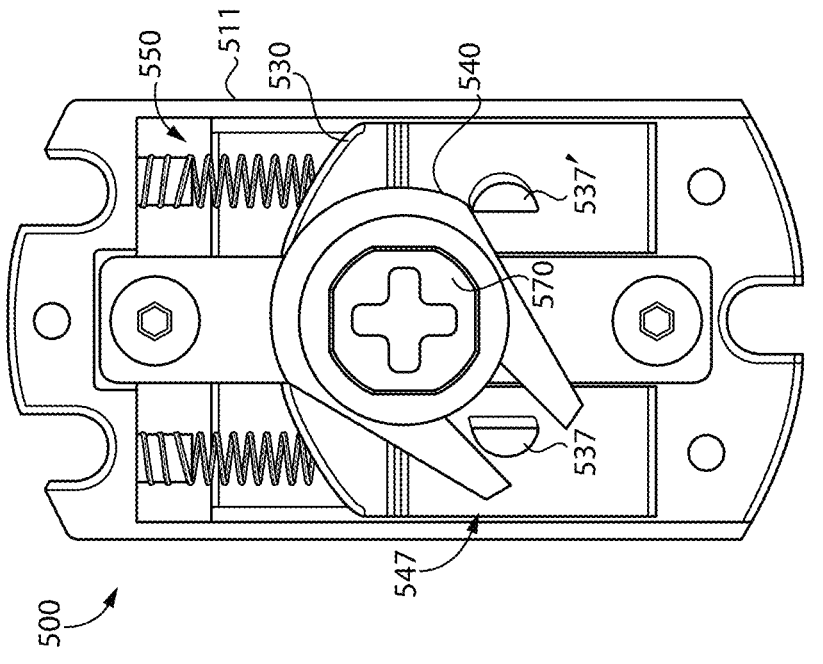
FIG. 19 is a plan view of the rotation converter illustrated in FIG. 18 while in an unactuated state.

With additional reference to FIGS. 19 and 20, illustrated therein is the rotation converter 500 in a home or unactuated state (FIG. 19) and in an actuated state (FIG. 20). In the unactuated state, each of the input cam 520, the shuttle 530, the output member 540, and the adapter 570 is in the unactuated or home position thereof. In the actuated state, each of the input cam 520, the shuttle 530, the output member 540, and the adapter 570 is in the actuated position thereof. As will be appreciated by those skilled in the art, rotation of the input cam 520 in either direction from its home position drives the shuttle 530 from its home position to its actuated position against the force of the bias mechanism 550 as described above with reference to the rotation converter 300.

In the configuration illustrated in FIGS. 19 and 20, the engagement between the first lug 537 of the shuttle 530 and the engagement section 547 of the output member 540 causes the output member 540 and the adapter 570 to rotate in a first rotational direction (clockwise in FIGS. 19 and 20). Thus, the rotation converter 500 in the first handing configuration causes the tailpiece 545 to rotate in the first rotational direction in response to rotation of the input cam 520 from its home position in either direction.

As will be appreciated, if the engagement section 547 were engaged with the second lug 537' instead of the first lug, such engagement would cause the output member 540 and the adapter 570 to rotate in an opposite second rotational direction (counter-clockwise in FIGS. 19 and 20). In other words, the rotation converter 500 in the second handing configuration will cause the tailpiece 545 to rotate in the second rotational direction in response to rotation of the input cam 520 from its home position in either direction. As described herein, the illustrated rotation converter 500 can be moved between the first handing configuration and the second handing configuration without requiring disassembly of the rotation converter 500, without removing the output member 540 from the case 510, and/or without the use of tools.

In certain embodiments, the rotation converter 500 may perform the function of rotational multiplication of the input rotation such that a predetermined input rotation provided to the input cam 520 results in a different output rotation of the output member 540. For example, the illustrated rotation converter 500 provides a rotation multiplier of about 1.38 such that an input rotation of 45° on the input cam 520 results in an output rotation of 62° by the output member 540. In certain embodiments, the rotation multiplier is greater than one, or 1.2 or greater. Those skilled in the art will readily recognize that the rotation multiplier may be adjusted as desired by appropriate selection of the position of the lugs 537, 537' relative to the rotational axis of the output member 540.

Figures 21, 22, 23:
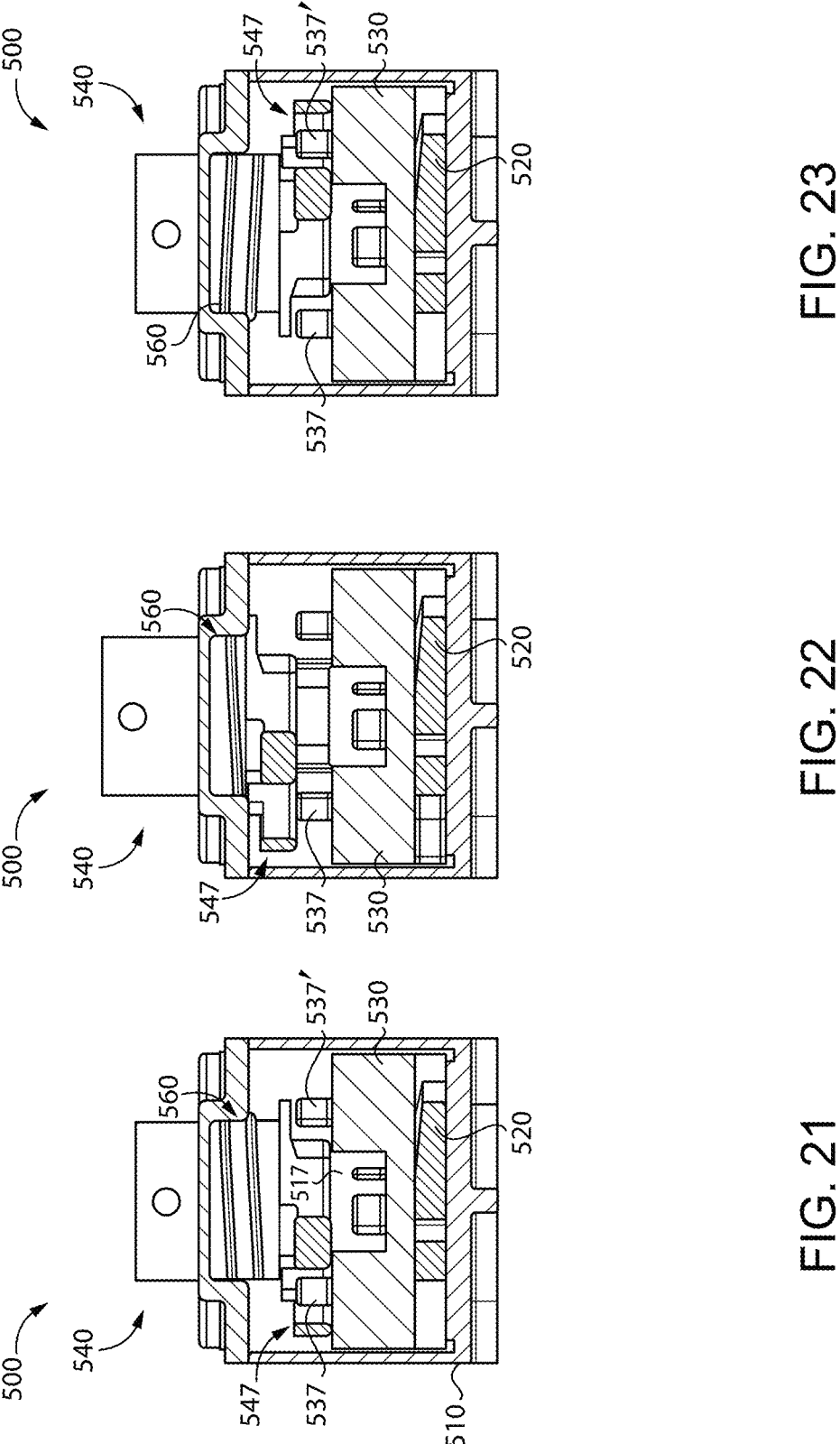
FIG. 21 is a partial cutaway view of the rotation converter illustrated in FIG. 18 while in a first handing configuration.
FIG. 22 is a partial cutaway view of the rotation converter illustrated in FIG. 18 while in a transitional state.
FIG. 23 is a partial cutaway view of the rotation converter illustrated in FIG. 18 while in a second handing configuration.

With additional reference to FIGS. 21-23, illustrated therein is the rotation converter 500 at various stages during a rehanding procedure. More particularly, FIG. 21 illustrates the rotation converter 500 in the first handing configuration, FIG. 22 illustrates the rotation converter 500 in a transitional configuration, and FIG. 23 illustrates the rotation converter 500 in the second handing configuration. As will be evident from the following description, rehanding of the illustrated rotation converter 500 may be performed without removing the output member 540 from the case 510, without opening the case 510, and without requiring the use of tools.

With the rotation converter 500 in the first handing configuration (FIG. 21), the output member 540 is in a first engaged position, in which the engagement section 547 is engaged with the first lug 537 of the shuttle 530. As a result, rotation of the input cam 520 in either direction from its home position results in rotation of the output member 540 in the first rotational direction as described above. Moreover, the bias mechanism 560 resists movement of the output member 540 from its first engaged position by biasing the output member 540 into engagement with the shuttle 530.

In order to transition the rotation converter 500 between its first handing configuration (FIG. 21) and its second handing configuration (FIG. 23), a user may exert a pulling force on the output member 540 to thereby move the output member 540 to a disengaged position in which the engagement section 547 is disengaged from each lug 537, 537', thereby placing the rotation converter 500 in the transitional state illustrated in FIG. 22. With the output member 540 in the disengaged position, the output member 540 can be rotated to align the engagement section 547 with the second lug 537'. The user may then release the output member 540 such that the bias mechanism 560 drives the output member 540 into engagement with the shuttle 530, thereby engaging the engagement section 547 with the second lug 537' and placing the rotation converter 500 in the second handing configuration.

With the rotation converter 500 in the second handing configuration (FIG. 23), the output member 540 is in its second engaged position, in which the engagement section 547 is engaged with the second lug 537' of the shuttle 530. As a result, rotation of the input cam 520 in either direction from its home position results in rotation of the output member 540 in the second rotational direction as described above. Moreover, the bias mechanism 560 resists movement of the output member 540 from its second engaged position by biasing the output member 540 into engagement with the shuttle 530. Those skilled in the art will readily recognize that the rotation converter 500 can be moved from the second handing configuration to the first handing configuration in a manner analogous to that described above with reference to moving the rotation converter 500 from the first handing configuration to the second handing configuration.

Figure 24:
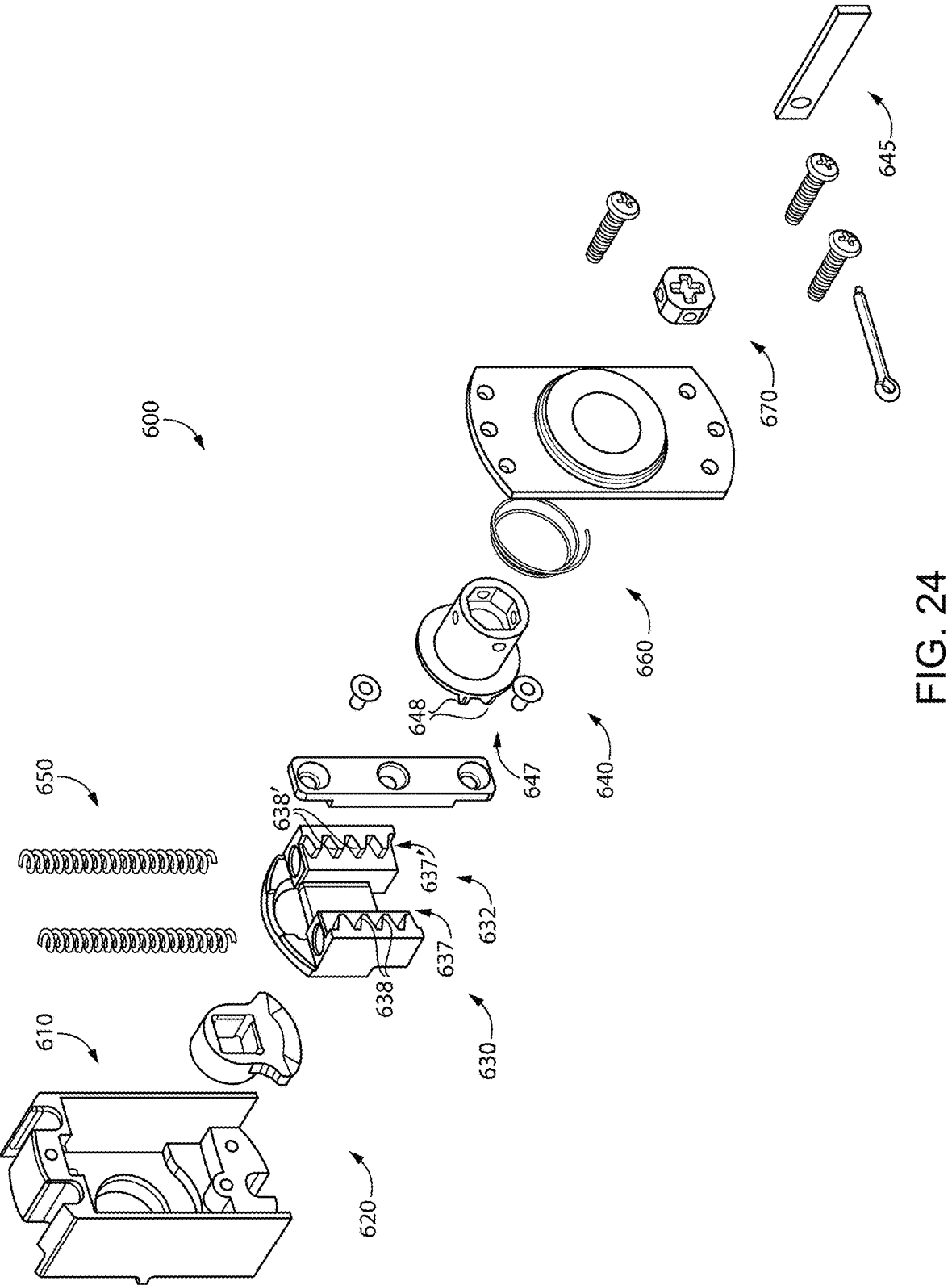
FIG. 24 is an exploded assembly view of a rotation converter according to certain embodiments, which may be utilized in the exit device assembly illustrated in FIG. 1.

With additional reference to FIG. 24, illustrated therein is a rotation converter 600 according to certain embodiments. The rotation converter 600 may, for example, be utilized as the rotation converter 92 of the exit device assembly 90. The rotation converter 600 is similar to the above-described rotation converter 500, and similar reference characters are used to indicate similar elements and features except where noted otherwise. For example, the rotation converter 600 generally includes a case 610, an input member in the form of an input cam 620, a shuttle 630, an output member 640, a first bias mechanism 650, a second bias mechanism 660, and an adapter 670, which respectively correspond to the case 510, the input cam 520, the shuttle 530, the output member 540, the first bias mechanism 550, the second bias mechanism 560, and the adapter 570. In the interest of conciseness, the following description of the rotation converter 500 focuses primarily on elements and features that are different from those described above with reference to the rotation converter 500. It should nonetheless be understood that features described in association with one embodiment of rotation converter may be utilized in connection with another embodiment of rotation converter.

In the illustrated form, the output side 632 of the shuttle 630 includes a first rack gear 637 in lieu of the lug 537, and may further include a second rack gear 637' in lieu of the second lug 537'. The first rack gear 637 includes a plurality of first teeth 638, and the second rack gear 637' includes a plurality of second teeth 638'. The output member 640 includes a toothed engagement section 647 operable to engage each rack gear 637, 637', and the toothed engagement section 647 includes one or more teeth 648. Like the above-described output member 340, the output member 640 further includes an untoothed section 649.

Each of the rack gears 637, 637' is operable to engage the toothed engagement section 647 to define a handing configuration of the rotation converter 600. In the illustrated form, the first rack 637 is engaged with the engagement section 647, thereby providing the rotation converter 600 with a first handing configuration. Like the rotation converter 500, the illustrated rotation converter 600 can be changed to a second handing configuration in which the rack gear 637' is engaged with the engagement section 647 by selectively moving the output member 640 against the force of the second bias mechanism 660 to a disengaged position in which the engagement section 647 is disengaged from the rack gears 637, 637'. Those skilled in the art will readily recognize that such rehanding may be performed along the lines described above with reference to FIGS. 21-23, and that the rotation multiplier provided by the rotation converter 600 may be adjusted by altering the offset distance between each rack gear 637, 637' and the rotational axis of the output member 640.

Figure 27:
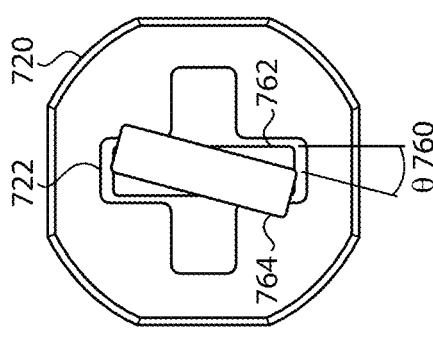
FIG. 27 is a plan view of the rotational coupling adapter and a twisted tailpiece.
Figure 26:
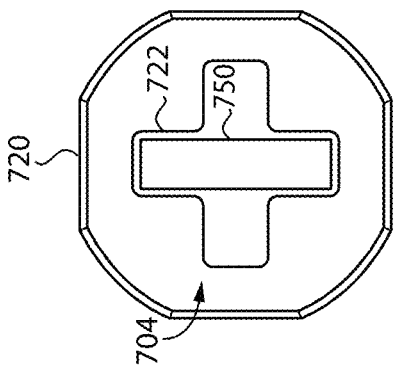
FIG. 26 is a plan view of a rotational coupling adapter and the straight tailpiece.
Figure 25:
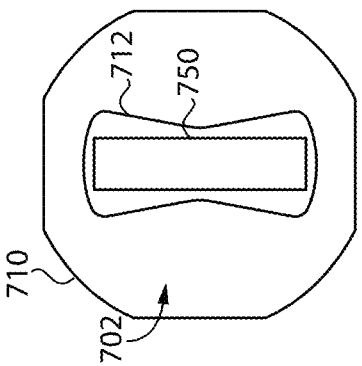
FIG. 25 is a plan view of a lost motion adapter and a straight tailpiece.

With additional reference to FIGS. 25-27, illustrated therein are various combinations of adapters and tailpieces that may be utilized in certain embodiments. Each of the adapters may, for example, be utilized as the adapter 570 of the rotation converter 500 and/or as the adapter 670 of the rotation converter 600. Each of the tailpieces may, for example, be utilized as the tailpiece 545 of the rotation converter 500 and/or as the tailpiece 645 of the rotation converter 600.

FIG. 25 illustrates a lost motion adapter 710 in combination with a straight tailpiece 750. The lost motion adapter 710 includes a bowtie opening 712 that receives the end portion of the straight tailpiece 750 such that a lost rotational motion connection 702 is formed between the adapter 710 and the tailpiece 750. In the illustrated form, the degree of lost rotational motion is about 13° such that the tailpiece 750 remains relatively stationary until the adapter 710 has rotated through the 13° lost rotational motion angle. Those skilled in the art will readily recognize that other lost rotational motion angles may be provided by adjusting the geometry of the bowtie opening 712.

FIG. 26 illustrates a rotational coupling adapter 720 in combination with the straight tailpiece 750. The opening 722 of the rotational coupling adapter 720 receives the end portion of the straight tailpiece 750 such that a rotational coupling 704 is formed between the adapter 710 and the tailpiece 750. As a result, rotation of the adapter 720 through a predetermined angle will cause a corresponding rotation of the tailpiece 750 through a corresponding and substantially equal angle.

FIG. 27 illustrates the rotational coupling adapter 720 in combination with a twisted tailpiece 760. The twisted tailpiece 760 includes a first end portion 762 that extends into the opening 722 of the adapter 720 such that a rotational coupling 706 is formed between the adapter 720 and the tailpiece 760. The tailpiece 760 also includes an opposite second end portion 764 that is rotationally offset relative to the first end portion 762 by an offset angle θ760. While the illustrated offset angle θ760 is about 11°, those skilled in the art will readily recognize that other offset angles are possible. In certain embodiments, the offset angle θ760 may be between 1° and 30°. By providing the tailpiece 760 with an offset angle θ760, a pretwist of the actuator 252 may be obtained, which may be advantageous as described herein.

In certain circumstances, it may be desirable to alter the amount by which the actuator 252 rotates in response to actuation of the trim 100. For example, in situations where different configurations of the pushbar assembly 200 require different rotations of the actuator 252 for actuation of the latch control assembly 230, it may be desirable for a single rotation converter to be capable of use with two or more such configurations of pushbar assembly.

By way of illustration, a first configuration of the pushbar assembly 200 may require that the actuator 252 be rotated to an angle of 49°, a second configuration of the pushbar assembly 200 may require that the actuator 252 be rotated to an angle of 62°, and a third configuration of the pushbar assembly 200 may require that the actuator 252 be rotated to an angle of 73°. In such circumstances, a single rotation converter (e.g., the rotation converter 500) may be capable of use with two or more such pushbar assembly configurations by selecting the appropriate configuration of the removable adapter and the tailpiece.

In one configuration, the rotation converter 500 may utilize the lost motion adapter 710 as the adapter 570 and the straight tailpiece 750 as the tailpiece 545. In such forms, the input cam 520 may be provided with a given input rotation (e.g., of about) 45° by the trim 100, and the shuttle 530 may cause the output member 540 to rotate by a greater output rotational angle (e.g., about) 62° as the shuttle 530 moves to its actuated position. Due to the lost rotational motion connection 702 formed between the adapter 710 and the tailpiece 750, the tailpiece 750 rotates the actuator 252 by the output rotational angle (e.g., about) 62° minus the lost motion angle (e.g., about 13°) to thereby rotate the actuator 252 of the first pushbar assembly configuration to the position appropriate for actuation of the first pushbar assembly configuration (e.g., about) 49°.

In a second configuration, the rotation converter 500 may utilize the rotational coupling adapter 720 as the adapter 570 and the straight tailpiece 750 as the tailpiece 545. In such forms, the input cam 520 may be provided with a given input rotation (e.g., of about) 45° by the trim 100, and the shuttle 530 may cause the output member 540 to rotate by a greater output rotational angle (e.g., about) 62° as the shuttle 530 moves to its actuated position. Due to the rotational coupling 704 formed between the adapter 720 and the tailpiece 750, the tailpiece 750 rotates the actuator 252 by the output rotational angle (e.g., about) 62° to thereby rotate the actuator 252 of the second pushbar assembly configuration to the position appropriate for actuation of the second pushbar assembly configuration (e.g., about) 62°.

In a third configuration, the rotation converter 500 may utilize the rotational coupling adapter 720 as the adapter 570 and the twisted tailpiece 760 as the tailpiece 545. In such forms, the input cam 520 may be provided with a given input rotation (e.g., of about) 45° by the trim 100, and the shuttle 530 may cause the output member 540 to rotate by a greater output rotational angle (e.g., about) 62° as the shuttle 530 moves to its actuated position. Due to the rotational coupling 706 formed between the adapter 720 and the tailpiece 760 and the twisted configuration of the tailpiece 760, the tailpiece 760 rotates the actuator 252 from a starting position corresponding to the offset angle θ760 (e.g., about) 11° by the output rotational angle (e.g., about) 62° to thereby rotate the actuator 252 of the third pushbar assembly configuration to the position appropriate for actuation of the third pushbar assembly configuration (e.g., about) 73°.

Those skilled in the art will readily appreciate that additional and alternative actuating angles may be provided by appropriately selecting the geometries of the opening in the adapter and/or the offset angle θ760 of the twisted tailpiece 760. As one example, if an actuating angle of 78° is desired for a particular configuration of pushbar assembly 200, the offset angle θ760 may be provided as 16°. As another example, if an actuating angle of 85° is desired for a particular configuration of pushbar assembly 200, the offset angle θ760 may be provided as 23°. It should be appreciated that different offset angles may be warranted, for example in cases where the output rotation of the output member 540 is different from that of the illustrated rotation converter 500.

As should be evident from the foregoing, the modular nature of the adapter 570 and tailpiece 545 may facilitate conversion of the rotation converter 500 between a plurality of configurations to adapt the rotation converter 500 for use with each of a plurality of different forms of pushbar assembly 200. Such modularity may reduce inventory requirements and/or increase flexibility of installation of the rotation converter 500 to exit device assemblies 90 of different configurations. Moreover, those skilled in the art will readily appreciate that removable adapters and tailpieces may be utilized in combination with rotation converters other than the rotation converter 500, including but not limited to the rotation converters 300, 400, 600.

Additionally, while certain illustrative forms of rotation converters have been illustrated and described herein, it is to be appreciated that rotation converters according to other embodiments may take other forms. As one example, a rotation converter according to certain embodiments may include one or more ratchets that convert bidirectional rotation of the drive spindle 130 from its home position to unidirectional rotation of the actuator 252 in the actuator actuating direction from the actuator home position. As another example, a rotation converter according to certain embodiments may include a four bar linkage that converts bidirectional rotation of the drive spindle 130 from its home position to unidirectional rotation of the actuator 252 in the actuator actuating direction from the actuator home position.

Figure 28:
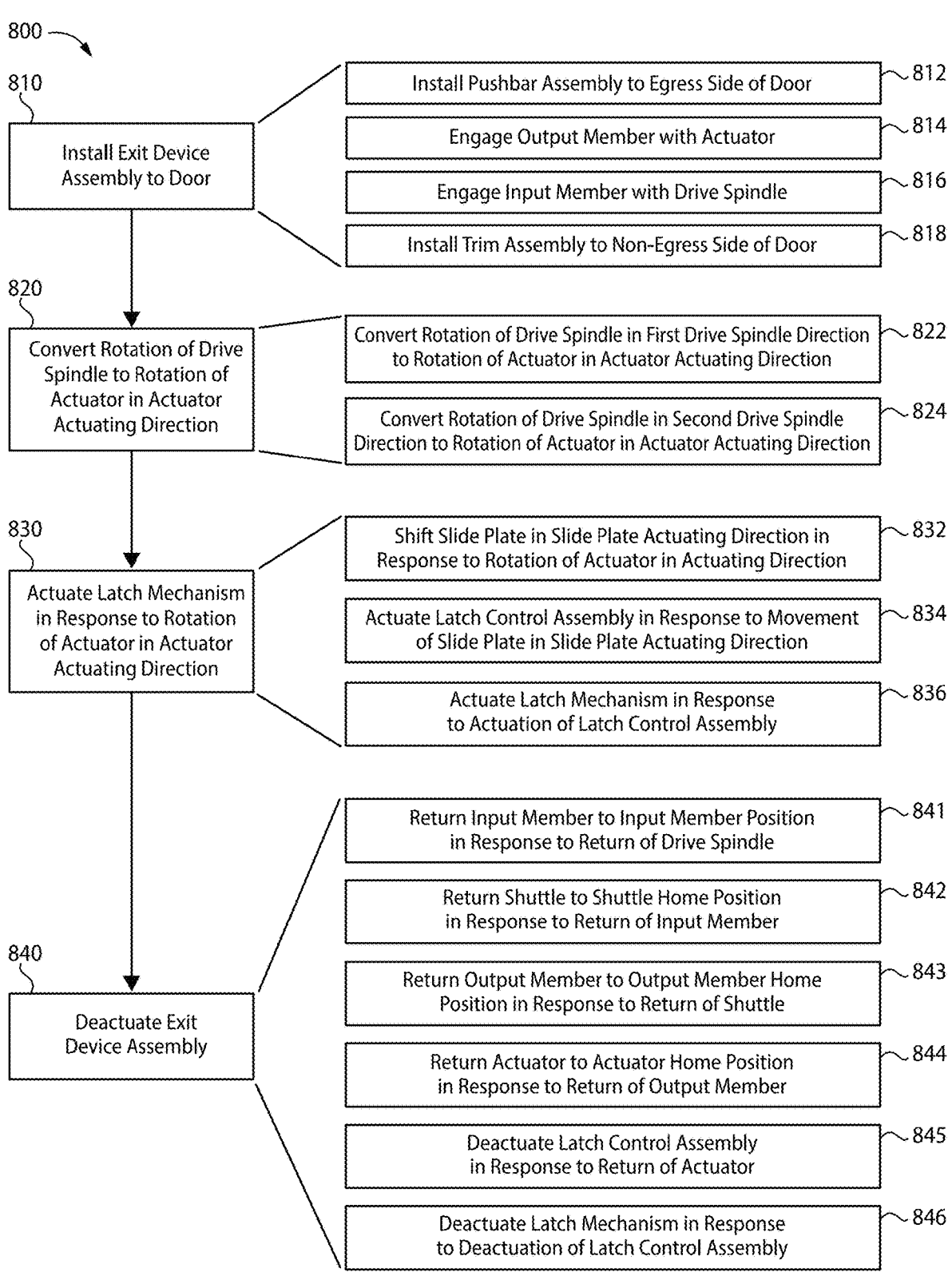
FIG. 28 is a schematic flow diagram of a process according to certain embodiments.

With additional reference to FIG. 28, illustrated therein is a process 800 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 800 is described with specific reference to the trim assembly illustrated in FIGS. 2-4 and the pushbar assembly illustrated in FIGS. 5-8, it is to be appreciated that the process 800 may be performed using a trim assembly of another form and/or a pushbar assembly of another form. Similarly, while the process 800 is described herein with specific reference to the rotation converter 300 illustrated in FIGS. 9-16, it is to be appreciated that the process 800 may be performed with rotation converters having additional or alternative features, including but not limited to the rotation converters 400, 500, 600.

The process 800 generally relates to the installation and/or operation of an exit device assembly, the exit device assembly including a trim assembly mounted to a non-egress side of a door, a pushbar assembly mounted to an egress side of the door, and a rotation converter installed to a door preparation formed within the door. In the illustrated form, the process 800 generally relates to the installation and/or operation of the exit device assembly 90, in which the trim assembly 100 is installed to the non-egress side 81 of the door 80, the pushbar assembly 200 is installed to the egress side 82 of the door 80, and a rotation converter 92 in the form of the rotation converter 300 is installed to the door preparation 85. Generally speaking, the trim assembly includes a drive spindle, and the pushbar assembly includes an actuator. While other forms are contemplated, in the illustrated form, the trim assembly 100 includes a drive spindle 130 and a handle 120 at least selectively operable to rotate the drive spindle 130, and the pushbar assembly 200 includes a latch control assembly 230 and an actuator 252 operable to actuate the latch control assembly 230 when rotated in an actuating direction from an actuator home position to an actuator actuated position.

The illustrated process 800 generally includes an installation procedure 810, a rotation converting procedure 820, an actuation procedure 830, and a deactuation procedure 840. The installation procedure 810 generally involves installing at least a portion of the exit device assembly 90 to the door 80, the rotation converting procedure 820 generally involves converting bidirectional rotation of the drive spindle 130 to unidirectional rotation of the actuator 252, the actuation procedure 830 generally involves actuating the latch control assembly 230 in response to rotation of the actuator 252, and the deactuating procedure 840 generally involves deactuating the exit device assembly 90.

The process 800 may begin with an installation procedure 810, which generally involves installing at least a portion of an exit device assembly to a door. In certain forms, the installation procedure 810 may involve block 812, which generally involves installing a pushbar assembly to an egress side of a door. For example, block 812 may involve installing the pushbar assembly 200 to the egress side 82 of the door 80 such that the actuator 252 is aligned with and accessible via the door preparation 85.

The installation procedure 810 may include block 814, which generally involves engaging an output member of a rotation converter with the actuator of the exit device. For example, block 814 may involve seating the rotation converter 300 in the door preparation 85 and engaging the output member 340 with the actuator 252 via a tailpiece 345. In certain embodiments, the tailpiece 345 may be coupled with one of the actuator 252 or the output member 340. In certain embodiments, the tailpiece 345 may be slidingly engaged with each of the actuator 252 and the output member 340. In further embodiments, block 814 may involve engaging the output member 340 with the actuator 252 in another manner (e.g. via one or more gears and/or an adapter such as those described above) to correlate rotation of the actuator 252 with rotation of the output member 340. As will be appreciated, the process 800 may involve selecting an adapter (e.g., the lost rotational motion adapter 710 or the rotational coupling adapter 720) and/or a tailpiece (e.g., the straight tailpiece 750 or the twisted tailpiece 760) appropriate for the particular configuration of pushbar assembly 200.

The installation procedure 810 may include block 816, which generally involves engaging an input member of the rotation converter with a drive spindle of the trim assembly. For example, block 816 may involve inserting the drive spindle 130 into the aperture 323 of the input cam 320 to rotationally couple the drive spindle 130 and the input cam 320. It is also contemplated that block 816 may involve engaging the input cam 320 with the drive spindle 130 in another manner (e.g. via one or more gears) to correlate rotation of the drive spindle 130 with rotation of the input cam 320.

The installation procedure 810 may include block 818, which generally involves installing the trim assembly to the non-egress side of the door. For example, block 818 may involve installing the trim assembly 100 to the non-egress side 81 of the door 80 with the drive spindle 130 engaged with the input cam 320.

The process 800 may include a rotation converting procedure 820, which generally involves converting bi-directional rotation of the drive spindle from the drive spindle home position to unidirectional rotation of the actuator in an actuator actuating direction from an actuator home position to an actuator actuated position.

The rotation converting procedure 820 includes block 822, which generally involves converting rotation of the drive spindle in a first drive spindle direction from the drive spindle home position to rotation of the actuator in the actuator actuating direction from an actuator home position to an actuator actuated position. For example, block 822 may involve converting rotation of the drive spindle 130 in the first drive spindle direction (counter-clockwise in FIG. 2) to rotation of the actuator 252 in the actuator actuating direction A252 (clockwise in FIG. 8).

In the illustrated form, block 822 involves rotating the input cam 320 in the input cam first rotational direction R320 in response to rotation of the drive spindle 130 in the drive spindle first rotational direction. Block 822 may include moving the shuttle 330 in the shuttle actuating direction A330 in response to rotation of the input member 320 in the input member first rotational direction R320, for example as a result of engagement of the first engagement portion 325 with the first cam surface 335. Block 822 may further include rotating the output member 340 in the output member actuating direction A340 in response to movement of the shuttle 330 in the shuttle actuating direction A330, for example as a result of the operation of the rack-and-pinion mechanism 307. Block 822 may further include rotating the actuator 252 in the actuator actuating direction A252 in response to rotation of the output member 340 in the output member actuating direction A340.

The rotation converting procedure 820 may further include block 824, which generally involves converting rotation of the drive spindle in a second drive spindle direction from the drive spindle home position to rotation of the actuator in the actuator actuating direction from an actuator home position to an actuator actuated position, wherein the second drive spindle direction is opposite the first drive spindle direction. For example, block 824 may involve converting rotation of the drive spindle 130 in the second drive spindle direction (clockwise in FIG. 2) to rotation of the actuator 252 in the actuator actuating direction A252 (clockwise in FIG. 8).

In the illustrated form, block 824 involves rotating the input cam 320 in the input cam second rotational direction R320' in response to rotation of the drive spindle 130 in the drive spindle second rotational direction. Block 824 may include moving the shuttle 330 in the shuttle actuating direction A330 in response to rotation of the input member 320 in the input member second rotational direction R320', for example as a result of engagement of the second engagement portion 326 with the second cam surface 336. The illustrated form of block 824 further involves rotating the output member 340 in the output member actuating direction A340 in response to movement of the shuttle 330 in the shuttle actuating direction A330, for example as a result of the operation of the rack-and-pinion mechanism 307. Block 824 may further include rotating the actuator 252 in the actuator actuating direction A252 in response to rotation of the output member 340 in the output member actuating direction A340.

In certain embodiments, the process 800 may include the actuating procedure 830, which generally involves actuating a latch mechanism in response to rotation of the actuator in the actuator actuating direction. As described herein, in the illustrated form, the actuating procedure 830 generally involves actuating the latch control assembly 230 in response to rotation of the actuator 252 from the actuator home position to the actuator actuated position in the actuator actuating direction, and actuating the latch mechanism 240 in response to actuation of the latch control assembly 230.

The actuating procedure 830 may include block 832, which generally involves shifting a slide plate in a slide plate actuating direction in response to rotation of the actuator in the actuator actuating direction. In the illustrated form, block 832 generally involves shifting the slide plate 235 in a downward direction as the projection 254 engages the protrusion 257.

The actuating procedure 830 may include block 834, which generally involves actuating the latch control assembly in response to movement of the slide plate in the slide plate actuating direction. In the illustrated form, block 834 involves actuating the latch control assembly 230 in response to downward movement of the slide plate 256 as described above.

The actuating procedure 830 may further include block 836, which generally involves actuating a latch mechanism in response to actuation of the latch control assembly. In the illustrated form, block 836 involve actuating the latch mechanism 240 in response to actuation of the latch control assembly 230, thereby retracting the latchbolt 242. It is also contemplated that block 836 may involve actuating another form of latch mechanism, such as a latch mechanism remote from the pushbar assembly 200 (e.g., a latch mechanism installed near the top of the door 80 and/or a latch mechanism installed near the bottom of the door 80).

In certain embodiments, the process 800 may include a deactuating procedure 840, which generally involves return- ing the exit device assembly to a deactuated state. In the illustrated form, the deactuating procedure 840 is performed in response to the drive spindle 130 returning to its home position, for example upon release of the handle 120.

The deactuating procedure 840 may include block 841, which generally involves returning the input member to the input member home position in response to return of the drive spindle to the drive spindle home position. For example, block 841 may involve causing the input cam 320 to return to the home position illustrated in FIG. 12 as the drive spindle 130 returns to the drive spindle home position (e.g., under a biasing force exerted by the trim assembly 100).

The deactuating procedure 840 may include block 842, which generally involves returning the shuttle to the shuttle home position in response to return of the input member to the input member home position. For example, block 842 may involve the bias mechanism 350 driving the shuttle 330 in a shuttle deactuating direction opposite the shuttle actu- ating direction A330 as the input cam 320 returns to the input cam home position.

The deactuating procedure 840 may include block 843, which generally involves returning the output member to the output member home position in response to return of the shuttle to the shuttle home position. For example, block 843 may involve the rack-and-pinion mechanism 307 driving the output member 340 to the output member home position as the shuttle 330 returns to the shuttle home position.

The deactuating procedure 840 may include block 844, which generally involves returning the actuator to the actua- tor home position in response to return of the output member to the output member home position. For example, block 844 may involve the tailpiece 345 rotating the actuator 252 in the actuator deactuating direction (counter-clockwise in FIG. 8) from the actuator actuated position to the actuator home position as the output member 340 returns to the output member home position.

The deactuating procedure 840 may include block 845, which generally involves deactuating the latch control assembly in response to return of the actuator to the actuator home position. For example, block 845 may involve shifting the slide plate 256 in a slide plate deactuating direction (upward in FIG. 8) as the actuator 252 rotates in the actuator deactuating direction from the actuator actuated position to the actuator home position, thereby deactuating the latch control assembly.

The deactuating procedure 840 may include block 846, which generally involves deactuating the latch mechanism in response to deactuation of the latch control assembly. For example, block 846 may involve extending the latchbolt 242 as the latch control assembly 230 deactuates, thereby deac- tuating the latch mechanism 240. It is also contemplated that block 846 may involve deactuating an additional or alter- native form of a latchbolt mechanism, such as one remote from the pushbar assembly 200.

Figure 29:
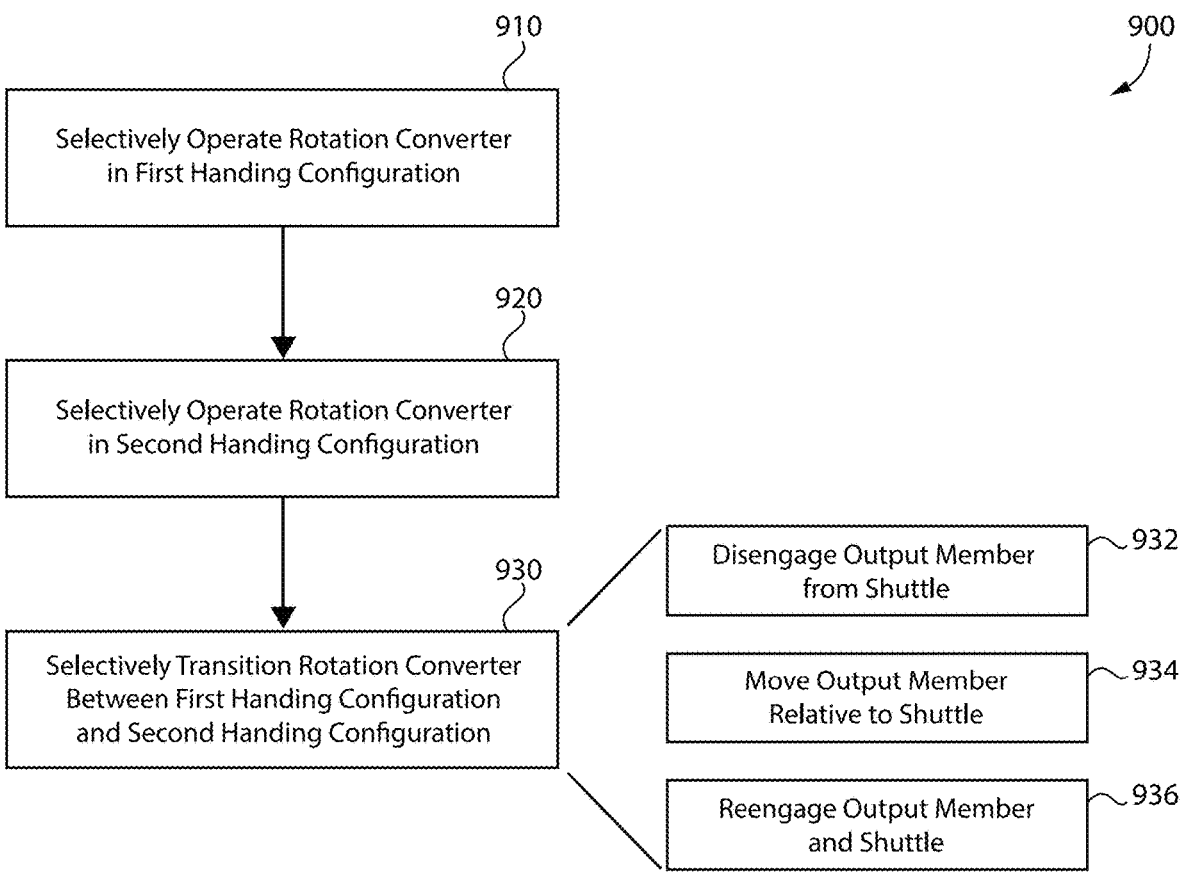
FIG. 29 is a schematic flow diagram of a process according to certain embodiments.

With additional reference to FIG. 29, illustrated therein is a process 900 according to certain embodiments. Blocks illustrated for the processes in the present application are understood to be examples only, and blocks may be com- bined or divided, and added or removed, as well as re- ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 900 is described with specific reference to the rotation converter 500 illustrated in FIGS. 18-23, it should be appreciated that the process 900 may be performed using rotation converters having additional or alternative features, including but not limited to the rotation converter 600.

The process 900 generally involves operating a rotation converter comprising a case, an input member, and an output member. For example, the process 900 may be performed using the rotation converter 500, which includes a case 510, an input member 520, and an output member 530.

The process 900 may include block 910, which generally involves selectively operating the rotation converter in a first handing configuration. For example, block 910 may involve operating the rotation converter 500 in the first handing configuration illustrated in FIG. 21. Operating the rotation converter in the first handing configuration generally involves rotating the output member in a first output direc- tion in response to each of rotation of the input member in a first input direction and rotation of the input member in a second input direction opposite the first input direction as described above.

The process 900 may include block 920, which generally involves selectively operating the rotation converter in a second handing configuration. For example, block 920 may involve operating the rotation converter 500 in the second handing configuration illustrated in FIG. 23. Operating the rotation converter in the first handing configuration gener- ally involves rotating the output member in a second output direction opposite the first output direction in response to each of rotation of the input member in the first input direction and rotation of the input member in the second input direction as described above.

The process 900 may include block 930, which generally involves selectively transitioning the rotation converter between a first handing configuration and a second handing configuration. In certain embodiments, the transitioning of block 930 may be performed without removing the output member from the case, without opening the case, and/or without the use of a tool, for example as described above with reference to FIGS. 21-23.

In certain embodiments, block 930 may include block 932, which generally involves disengaging the output mem- ber from a shuttle of the rotation converter. For example, block 932 may involve moving the output member 540 along the rotational axis thereof to disengage the output member 540 from the shuttle 530 as described above with reference to FIGS. 21 and 22.

In certain embodiments, block 930 may include block 934, which generally involves moving the output member relative to the shuttle while the output member is disengaged from the shuttle. For example, block 934 may involve rotating the output member 540 relative to the shuttle 530 while the output member 540 is disengaged from the shuttle 530 as described above with reference to FIGS. 22 and 23.

In certain embodiments, block 930 may include block 936, which generally involves reengaging the output mem- ber with the shuttle. For example, block 936 may involve moving the output member 540 along its rotational axis as described above with reference to FIGS. 22 and 23. In certain embodiments, block 936 may involve a bias mechanism 560 driving the output member 540 into engagement with the shuttle 530 in response to release of the output member 540 by a user.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A rotation converter, comprising:

a case;

an input member mounted to the case for rotation in each of a first input direction and a second input direction;

an output member mounted to the case for rotation in each of a first output direction and a second output direction, wherein the output member comprises an axial recess;

a shuttle engaged between the input member and the output member; and an adapter removably seated in the axial recess and rotationally coupled with the output member, the removable adapter comprising an opening operable to receive a tailpiece; and wherein the rotation converter has a first configuration in which the shuttle rotates the output member in the first output direction in response to each of (a) rotation of the input member in the first input direction and (b) rotation of the input member in the second input direction.

2. The rotation converter of claim 1, wherein the rotation converter has a second configuration in which the shuttle rotates the output member in the second output direction in response to each of (a) rotation of the input member in the first input direction and (b) rotation of the input member in the second input direction.

3. The rotation converter of claim 2, wherein the rotation converter is operable to transition between the first configuration and the second configuration without opening the case.

4. The rotation converter of claim 2, wherein the rotation converter is operable to transition between the first configuration and the second configuration without removing the output member from the case.

5. The rotation converter of claim 1, wherein the opening is configured to receive the tailpiece via a lost motion connection.

6. The rotation converter of claim 1, further comprising an additional adapter operable to replace the adapter, the additional adapter comprising an additional opening having a different geometry from the opening.

7. The rotation converter of claim 6, wherein one of the opening or the additional opening is configured to receive the tailpiece with a lost motion connection; and wherein the other of the opening or the additional opening is configured to receive the tailpiece with a rotational coupling connection.

8. A system comprising the rotation converter of claim 1, the system further comprising the tailpiece;

wherein the tailpiece comprises a first end portion that extends into the opening and an opposite second end portion; and wherein the tailpiece is twisted such that the first end portion and the second end portion are angularly offset from one another.

9. A method of using a rotation converter comprising a case, an input member and an output member, the method comprising:

removably coupling an adapter with the output member, the adapter comprising an opening;

inserting a tailpiece into the opening such that the tailpiece is engaged with the output member via the adapter; and operating the rotation converter in a first handing configuration, comprising rotating the output member in a first output direction in response to each of (a) rotation of the input member in a first input direction and (b) rotation of the input member in a second input direction opposite the first input direction.

10. The method of claim 9, further comprising:

transitioning the rotation converter from the first handing configuration to a second handing configuration; and operating the rotation converter in the second handing configuration, comprising rotating the output member in a second output direction in response to each of (a) rotation of the input member in the first input direction and (b) rotation of the input member in the second input direction; and wherein the second output direction is opposite the first output direction.

11. The method of claim 10, wherein the transitioning of the rotation converter from the first handing configuration to the second handing configuration does not require removal of the output member from the case, does not require opening the case, and/or does not require use of a tool.

12. The method of claim 10, wherein the transitioning comprises:

disengaging the output member from a shuttle of the rotation converter;

moving the output member relative to the shuttle while the output member is disengaged from the shuttle; and reengaging the output member with the shuttle.

13. The method of claim 9, further comprising:

removing the adapter from the output member;

removably coupling an additional adapter with the output member, the additional adapter comprising an additional opening; and inserting the tailpiece into the additional opening such that the tailpiece is engaged with the output member via the additional adapter.

14. The method of claim 9, wherein inserting the tailpiece into the opening forms a lost rotational motion connection between the tailpiece and the adapter.

15. The method of claim 9, wherein inserting the tailpiece into the opening forms a rotational coupling between the tailpiece and the adapter.

16. A rotation converter configured for use with an exit device comprising an actuator, the rotation converter comprising:

an input member operable to rotate in each of a first input direction and a second input direction;

an output member operable to rotate in each of a first output direction and a second output direction, wherein the output member comprises a recess;

a shuttle engaged between the input member and the output member;

a first adapter configured to be seated in the recess and to form a lost rotational motion connection between the actuator and the output member; and a second adapter configured to be seated in the recess and to form a rotational coupling between the actuator and the output member; and wherein the rotation converter has a first configuration in which the shuttle rotates the output member in the first output direction in response to each of (a) rotation of the input member in the first input direction and (b) rotation of the input member in the second input direction.

17. The rotation converter of claim 16, further comprising a first tailpiece including a first tailpiece first end portion operable to engage the actuator and a first tailpiece second end portion operable to engage each of the first adapter and the second adapter.

18. The rotation converter of claim 17, further comprising a second tailpiece, the second tailpiece comprising a second tailpiece first end portion operable to engage the actuator and a second tailpiece second end portion operable to engage each of the first adapter and the second adapter; and wherein the second tailpiece is twisted such that the second tailpiece first end portion and the second tailpiece second end portion are angularly offset from one another.

19. The rotation converter of claim 16, wherein the first adapter comprises a bowtie opening.

20. The rotation converter of claim 16, further comprising a tailpiece including a first end portion engaged with the actuator;

wherein the first adapter comprises a first opening operable to receive a second end portion of the tailpiece to thereby form the lost rotational motion connection between the first adapter and the tailpiece; and wherein the second adapter comprises a second opening operable to receive the second end portion of the tailpiece to thereby form the rotational coupling between the second adapter and the tailpiece.

*    *    *    *    *